(12) United States Patent
Nomura et al.

(10) Patent No.: US 8,534,590 B2
(45) Date of Patent: Sep. 17, 2013

(54) COIL WINDING SYSTEM AND METHOD FOR FABRICATING MOLDED COIL

(75) Inventors: Tomohiro Nomura, Kakuda (JP); Hirozumi Kon, Kakuda (JP); Satoshi Tokuda, Kakuda (JP); Osamu Hinata, Kakuda (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 13/554,428

(22) Filed: Jul. 20, 2012

(65) Prior Publication Data
US 2012/0286085 A1 Nov. 15, 2012

Related U.S. Application Data

(62) Division of application No. 12/230,505, filed on Aug. 29, 2008, now Pat. No. 8,253,524.

(30) Foreign Application Priority Data

Oct. 4, 2007 (JP) ................. 2007-260860
Oct. 4, 2007 (JP) ................. 2007-260861
Oct. 26, 2007 (JP) ................. 2007-278948
Oct. 26, 2007 (JP) ................. 2007-278949
Jan. 25, 2008 (JP) ................. 2008-014550

(51) Int. Cl.
*B65H 54/64* (2006.01)
(52) U.S. Cl.
USPC .......................... 242/438; 242/448; 242/432.5
(58) Field of Classification Search
USPC ................... 242/433, 433.4, 437, 437.1, 438, 242/448, 432.5
See application file for complete search history.

(56) References Cited

U.S. PATENT DOCUMENTS

| | | | |
|---|---|---|---|
| 2,573,976 A * | 11/1951 | Linders | 242/432.3 |
| 3,566,192 A | 2/1971 | Stump, Jr. | |
| 4,178,677 A | 12/1979 | Weisse et al. | |
| 5,226,221 A | 7/1993 | Kilgore | |
| 5,860,615 A * | 1/1999 | Burch | 242/432.5 |
| 6,118,361 A | 9/2000 | Ogawa | |

(Continued)

FOREIGN PATENT DOCUMENTS

| | | |
|---|---|---|
| JP | 2003-317792 | 11/2003 |
| JP | 2007-067090 | 3/2007 |
| JP | 2009-111015 | 5/2009 |

OTHER PUBLICATIONS

Notice of Allowance U.S. Appl. No. 13/554,463 dated Jan. 28, 2013.

(Continued)

*Primary Examiner* — Emmanuel M Marcelo
(74) *Attorney, Agent, or Firm* — Squire Sanders (US) LLP

(57) ABSTRACT

There is provided a system for readily and efficiently fabricating a wound coil composed of a bobbinless coil. The system includes a coil winding device having an upper jig to which an upper plate is attached and a lower jig to which a lower plate is attached which are provided so as to be relatively displaceable and a tension device for applying predetermined tension to a wire rod fed from a wire rod supplying source. The coil winding device is provided with a claw section having first through third split claws that function as a winding section around which the wire rod is wound between the upper and lower plates and that slide in a radial direction when the upper jig is assembled coaxially with the lower jig.

7 Claims, 27 Drawing Sheets

(56) References Cited

U.S. PATENT DOCUMENTS

| | | |
|---|---|---|
| 6,749,144 B2 * | 6/2004 | Komuro et al. ............ 242/432.5 |
| 7,002,444 B2 | 2/2006 | Iwazaki et al. |
| 7,562,438 B2 * | 7/2009 | Smirnov et al. ................. 29/732 |
| 2001/0005166 A1 | 6/2001 | Coulombier |
| 2002/0030134 A1 * | 3/2002 | Sugiuchi .................... 242/445.1 |
| 2004/0031874 A1 * | 2/2004 | Kimura et al. ................ 242/433 |
| 2005/0034672 A1 | 2/2005 | Lee et al. |
| 2006/0156536 A1 | 7/2006 | Nemoto |

OTHER PUBLICATIONS

JP Office Action for JP Application No. 2008-014550.

* cited by examiner

AFTER INSERTION

ENLARGED VIEW OF REGION P

ENLARGED VIEW OF REGION Q

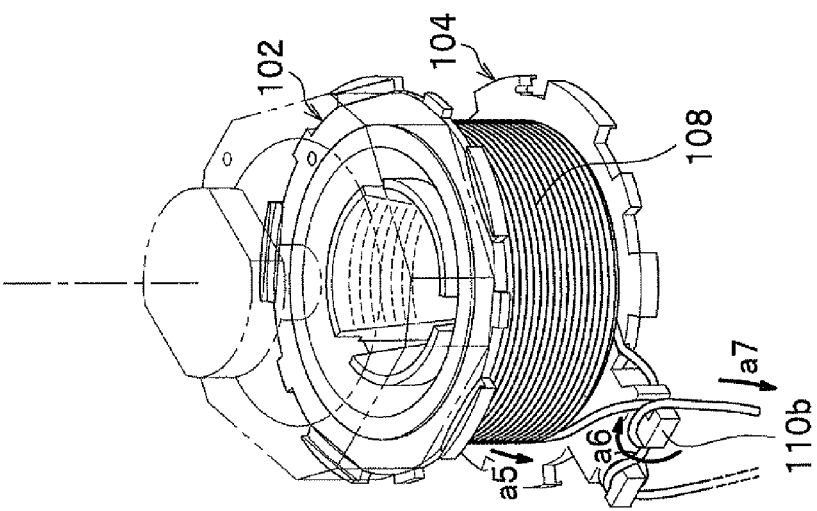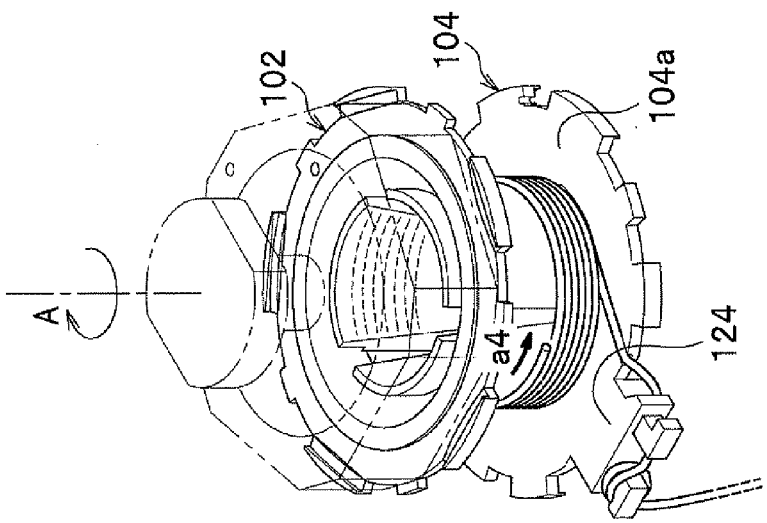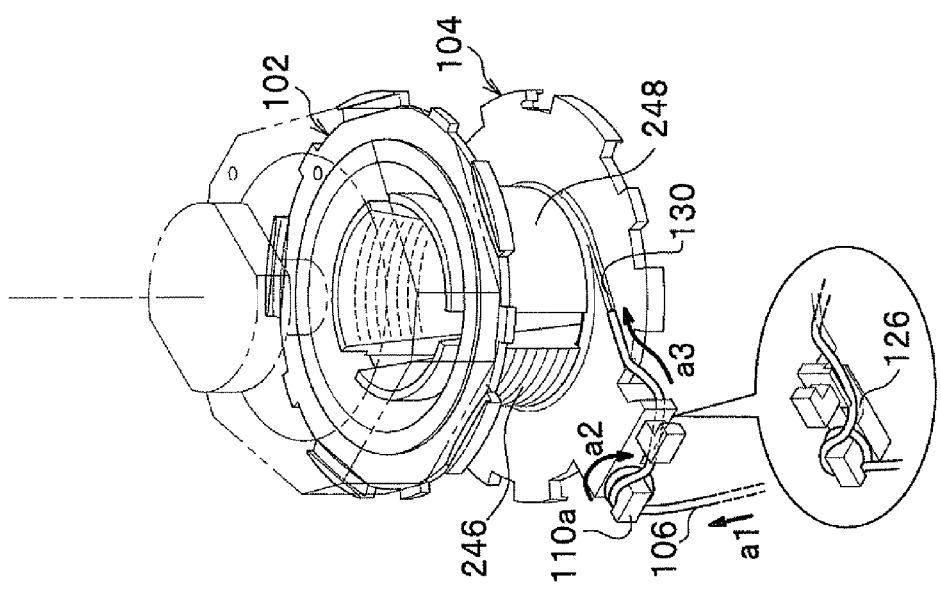

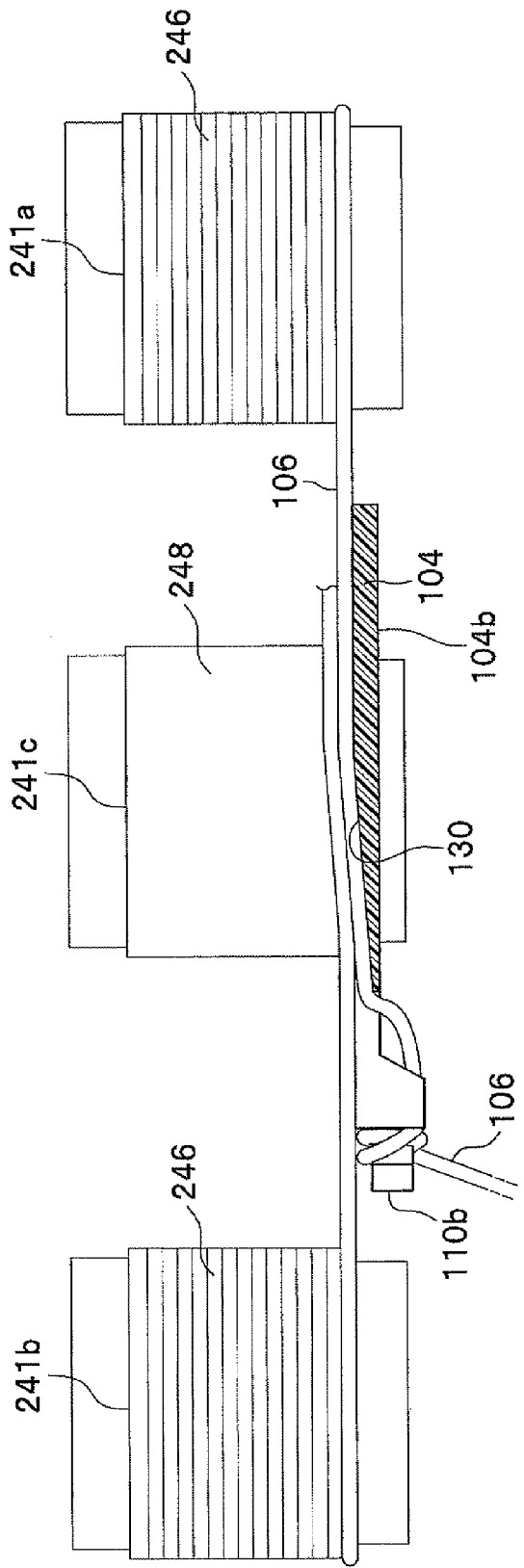

COIL WINDING SYSTEM AND METHOD FOR FABRICATING MOLDED COIL

CROSS REFERENCE TO RELATED APPLICATIONS

This application is a divisional of patent application Ser. No. 12/230,505, filed on Aug. 29, 2008 (herein incorporated by reference), which claims the foreign priority benefit under Title 35, United States Code, §119(a)-(d) of Japanese Patent Application Nos. 2007-260860 and 2007-260861, filed on Oct. 4, 2007, 2007-278948 and 2007-278949, filed on Oct. 26, 2007 and 2008-14550, filed on Jan. 25, 2008 in the Japan Patent Office, the disclosures of which are herein incorporated by reference in their entirety.

BACKGROUND OF THE INVENTION

1. Field of the Invention

The present invention relates to a coil winding system for fabricating a wound coil having a coil (solenoid) to be assembled into electromagnetic devices such as an electromagnetic valve and an electromagnetic actuator for example and to a method for fabricating a molded coil.

2. Description of Related Art

Heretofore, there have been known electromagnetic devices such as an electromagnetic valve that actuates a valve by attracting a movable core to a stationary core side by electromagnetic force generated by exciting a wound coil that composes a solenoid for example. Electrical insulation (isolation) of such electromagnetic devices has been maintained by coating an outer surface of the wound coil by a resin material by means of molding and the like.

Then, the present applicants have proposed a method of fabricating a bobbinless coil assembly by integrally molding a coil cover (coil coating member) made of a synthetic resin on an outer peripheral surface and both end surfaces in an axial direction, except of an inner surface, of a cylindrical bobbinless coil as shown in Japanese Patent Application Laid-open No. 2007-67090.

The present invention has been made in connection with this proposal and generally seeks to provide a coil winding device capable of stably disposing upper and lower plates above and under a claw section in preferably obtaining a bobbinless wound coil.

The present invention also seeks to provide a coil winding method capable of readily forming a bobbinless coil by winding a wire rod and of steadily securing isolation of the wound coil and to provide the wound coil.

The invention also seeks to provide a method for molding a solenoid by resin capable of assuring a favorable fluidity by fully filling the molten resin into a cavity for forming a thin portion on an outer end surface along an axial direction of a molded resin and to provide the molded resin.

The invention also seeks to provide a coil winding system that allows such a wound coil composed of the bobbinless coil to be readily and efficiently fabricated.

The invention primarily seeks to provide a method that allows a molded coil containing the wound coil composed of the bobbinless coil to be readily and efficiently fabricated.

SUMMARY OF THE INVENTION

In order to attain the aforementioned objects, the invention provides a coil winding system for winding a coil as a wound coil, including a coil winding device provided with an upper jig to which an upper plate is attached and a lower jig to which a lower plate is attached in such a manner that the upper and lower jigs are relatively displaceable, a wire rod supplying means for supplying a wire rod to be wound around the coil winding device as the coil and a tension device for applying predetermined tension to the wire rod supplied to the coil winding device, wherein the coil winding device has a claw section as a wire winding section around which the wire rod is wound between the upper and the lower plates and the claw section contains a plurality of split claws that slide in a radial direction when the upper jig is assembled coaxially with the lower jig.

According to the invention described above, the upper and lower plates are held while being separated by a predetermined distance when the upper jig to which the upper plate is attached is assembled with the lower jig to which the lower plate is attached by relatively displacing from each other. In succession, the wire rod is supplied from the wire rod supplying means to the coil winding device while applying the predetermined tension to the wire by the tension device, so that the wire rod is wound around the wire winding section provided on a peripheral surface of the claw section of the coil winding device.

As a result, according to the invention, the wound coil composed of the bobbinless coil may be formed readily and efficiently by holding the upper and lower plates separated by the predetermined distance by the upper and lower jigs and by winding the wire rod around the wire winding section on the peripheral surface of the claw section provided between the upper and lower plate.

In this case, the wound coil has a stacked coil having the coil stacked into a plurality of levels by the wire rod wound between the upper and lower plates and a weaving wire for holding the upper and lower plates by alternately weaving projections formed around an outer periphery of the upper and lower plates. Accordingly, the bobbinless coil in which no cylindrical coil bobbin is provided on the inner peripheral surface of the stacked coil may be held stably by the weaving wire without loosening the stacked coil.

Uniform holding force may be also generated in the peripheral direction by weaving the weaving wire around the side peripheral surface of the stacked coil and the uniform holding force can suitably hold the stacked coil composed of the bobbinless coil.

Still more, the invention allows a molded coil to be formed through steps of forming the stacked coil having the coil stacked into a plurality of levels by winding the wire rod between the upper and lower plates, forming the wound coil composed of the bobbinless coil by holding the upper and lower plates by the weaving wire by alternately weaving the projections formed around the outer periphery of the upper and lower plates and then loading the wound coil into a cavity of a die assembly and coating the wound coil by molten resin.

Thus, the invention allows the molded coil containing the wound coil composed of the bobbinless coil to be readily and efficiently formed by implementing the molding step of coating the wound coil by the molten resin after forming the stacked coil and forming the wound coil by holding the upper and lower plates of the stacked coil by the weaving wire.

Accordingly, the invention provides the coil winding system that allows the wound coil composed of the bobbinless coil to be readily and efficiently fabricated. The invention also provides the method that allows the molded coil containing the wound coil composed of the bobbinless coil to be readily and efficiently fabricated.

BRIEF DESCRIPTION OF THE DRAWINGS

FIGS. 19A through 19C are partially omitted perspective views showing a sequence how the wire rod is wound around the claw section provided between the upper and lower plates;

FIG. 20 is a partially cut-away side view showing a state when the wire rod is wound around first through third split claws composing the claw section by representing peripheral faces of the first through third split claws in flat for convenience sake;

PREFERRED EMBODIMENTS OF THE INVENTION

Figure 1:
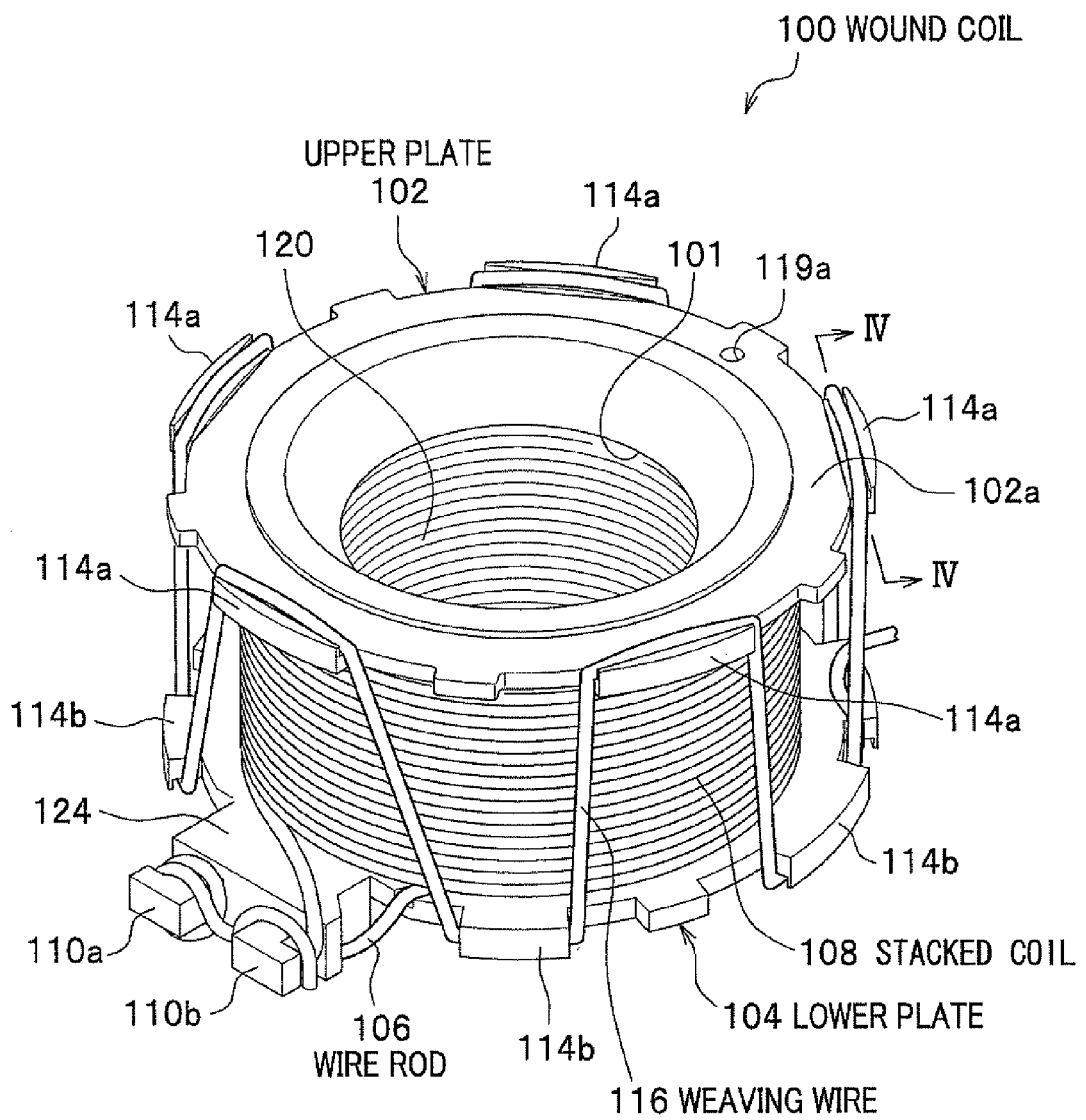
FIG. 1 is an enlarged perspective view of a wound coil fabricated by means of a coil winding system according to an embodiment of the invention.
Figure 3:
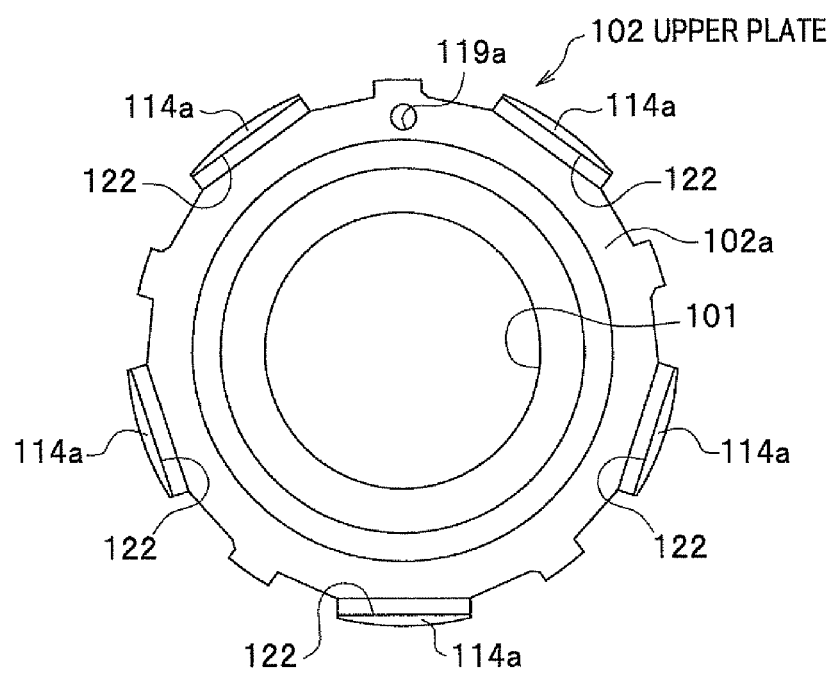
FIG. 3 is a plan view when an upper plate composing the wound coil described above is seen from above thereof.
Figure 4:
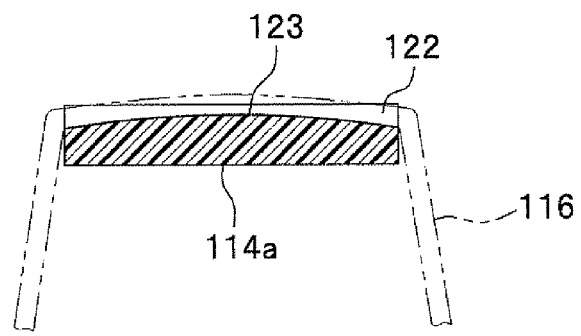
FIG. 4 is a longitudinal section view of the wound coil seen along a line IV-IV in FIG. 1.
Figure 5:
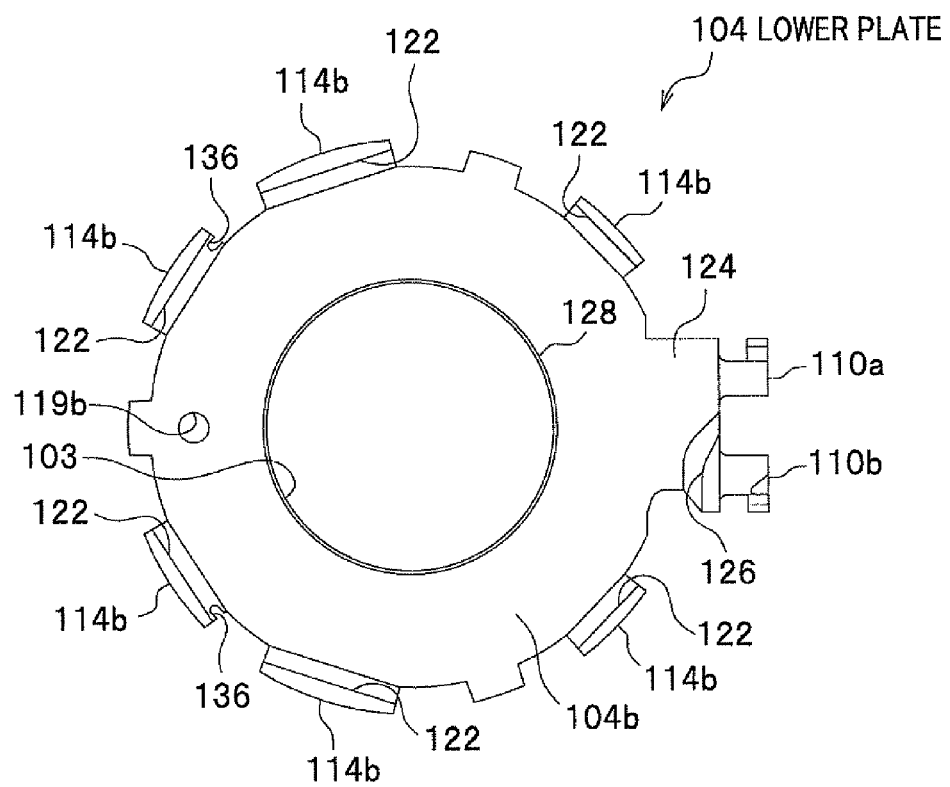
FIG. 5 is a bottom view showing an under surface of a lower plate composing the wound coil.
Figure 6:
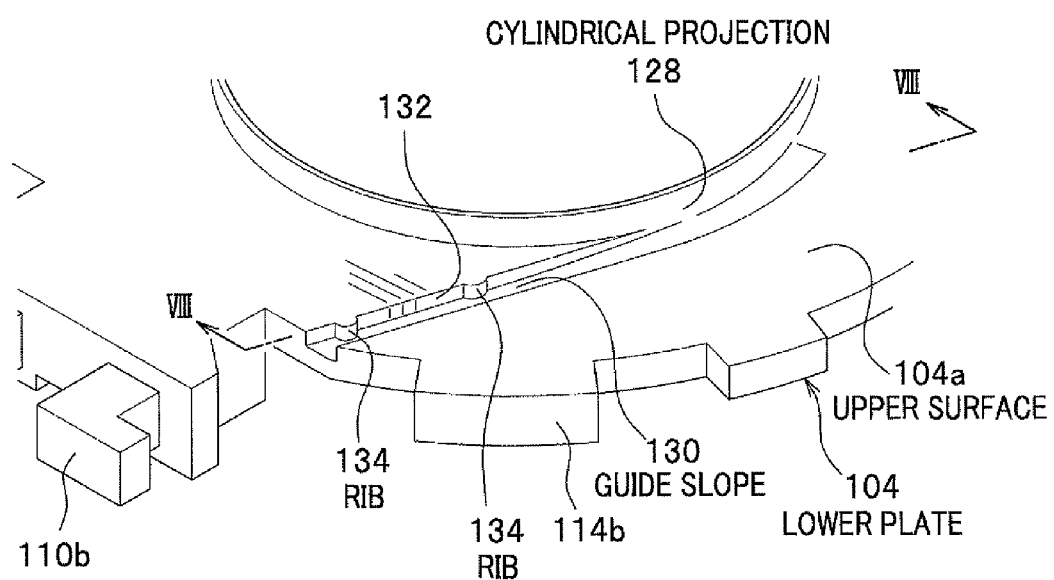
FIG. 6 is a partially enlarged perspective view showing a guide slope provided on an upper surface of the lower plate.
Figure 7:
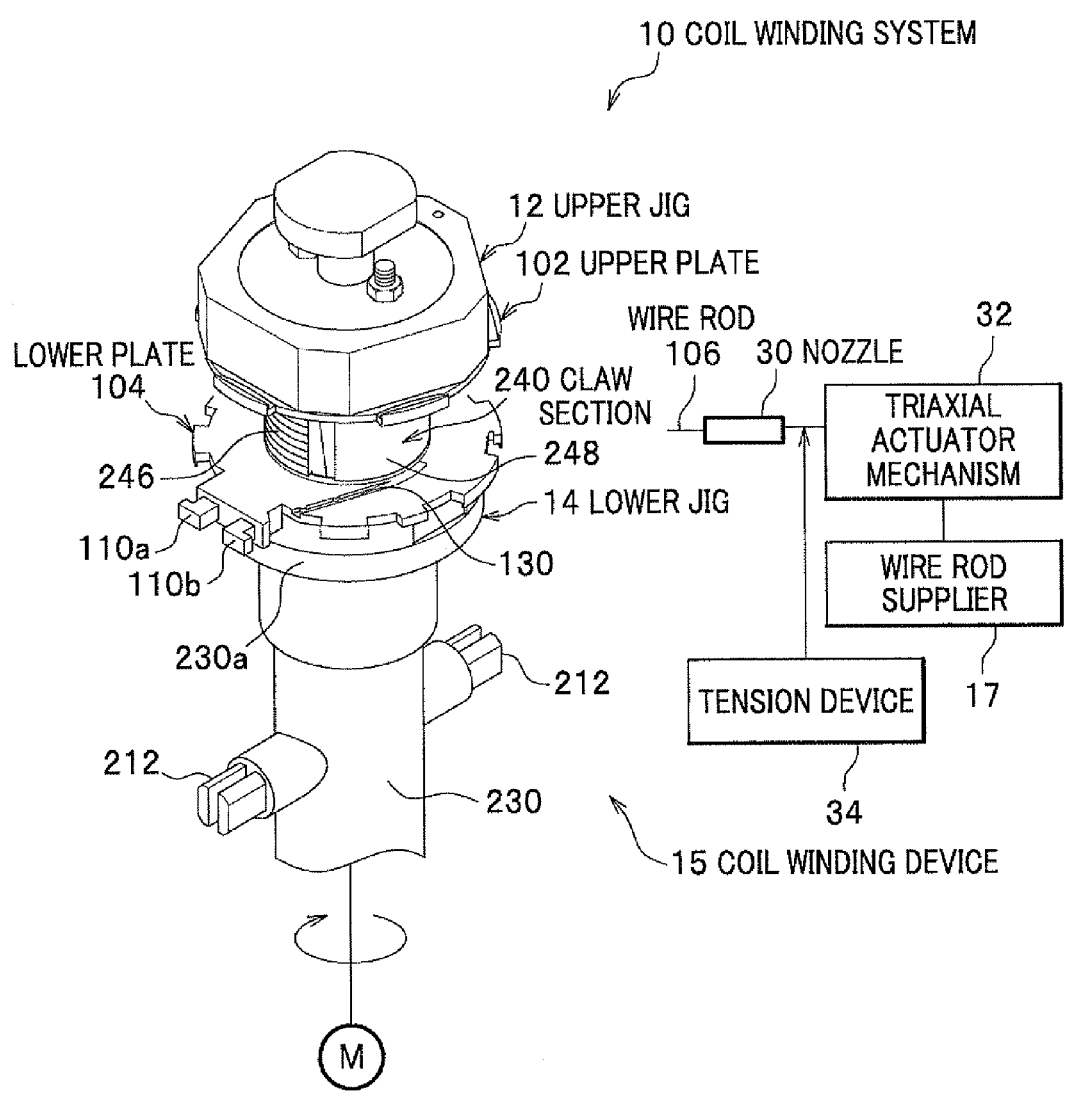
FIG. 7 is a schematic structural perspective view of the coil winding system according to the embodiment of the invention.

Next, preferred embodiments of the invention will be explained below with reference to the appended drawings. FIG. 1 is an enlarged perspective view of a wound coil fabricated by means of a coil winding system according to an embodiment of the present invention, FIG. 2 is a longitudinal section view of the wound coil shown in FIG. 1, FIG. 3 is a plan view when an upper plate composing the wound coil described above is seen from above thereof, FIG. 4 is a longitudinal section view of the wound coil seen a line IV-IV in FIG. 1, FIG. 5 is a bottom view showing an under surface of a lower plate composing the wound coil, FIG. 6 is a partially enlarged perspective view showing a guide slope provided on an upper surface of the lower plate and FIG. 7 is a schematic structural perspective view of the coil winding system according to the embodiment of the invention.

At first, the wound coil 100 in which a wire rod 106 is wound by means of the coil winding system 10 shown in FIG. 7 will be explained. It is noted that in a step of winding the wire rod 106 described below, an axial direction will be defined as a column direction of the wire rod 106 and a radial direction as a level direction.

Figure 2:
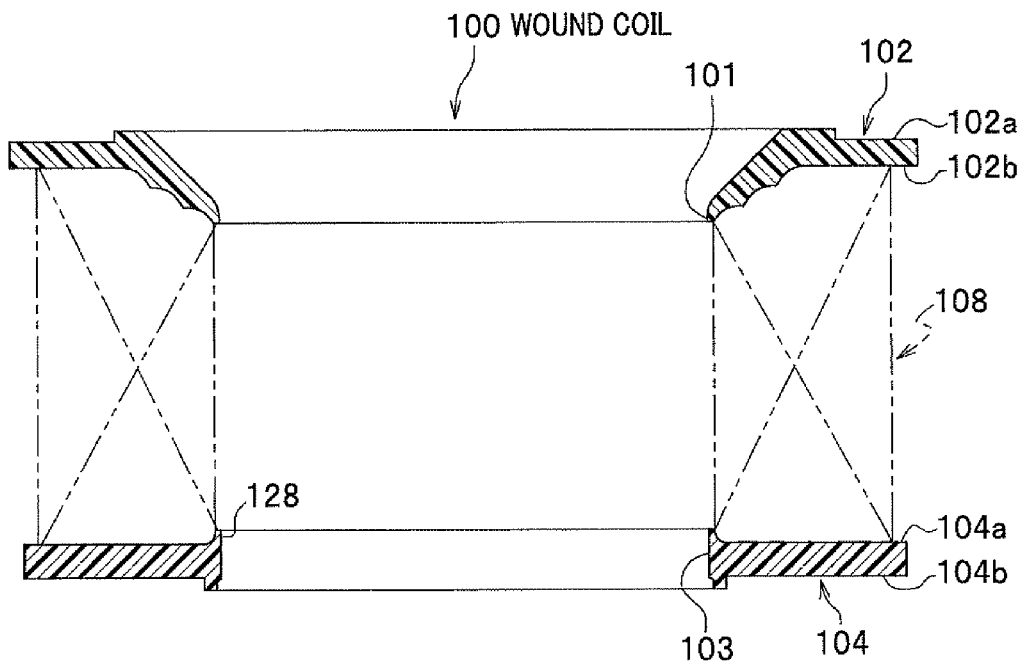
FIG. 2 is a longitudinal section view of the wound coil shown in FIG. 1.

As shown in FIGS. 1 and 2, the wound coil 100 includes an upper plate 102 (the upper plate 102 has an upper surface 102a and an under surface 102b) made of a resin material and having a through hole 101 through which an upper jig 12 of the coil winding system 10 is inserted and a lower plate 104 (the lower plate 104 has an upper surface 104a and an under surface 104b) made of a resin material and having a through hole 103.

The wound coil 100 also includes a stacked coil 108 having a coil formed by winding and stacking a wire rod (conductive wire) into a plurality of levels and by sandwiching between the upper and lower plates 102 and 104, and a weaving wire 116 for holding the upper and lower plates 102 and 104 by alternately weaving circular arc projections 114a and 114b of the upper and lower plates 102 and 104 disposed in zigzag without being superimposed in a vertical direction. It is noted that no core member such as a coil bobbin is provided within a coil inner peripheral surface 120 of the stacked coil 108 and the surface 120 is exposed to the outside.

The circular arc projections 114a and 114b protruding in a radial outward direction from the outer peripheral portions of the upper and lower plates 102 and 104 have first guide grooves 122 formed so as to guide the weaving wire 116 in weaving the weaving wire 116 (see FIGS. 3 and 5). As shown in FIG. 4, a bottom inner wall of the first guide groove 122 is formed so as to have a curved face 123 whose center part is slightly raised when seen longitudinally in section, so that the weaving wire 116 may be readily woven to the circular arc projections 114a and 114b and the weaving wire 116 is kept to have adequate tensile force.

It is noted that the circular arc projections 114a are provided at five places of the upper plate 102 (see FIG. 3) and the circular arc projections 114b are provided at six places of the lower plate 104 (see FIG. 5). The first guide groove 122 provided on the circular arc projection 114a of the upper plate 102 is formed so as to open upward and the first guide groove 122 provided on the circular arc projection 114b of the lower plate 104 is formed so as to open downward respectively to suitably hold the weaving wire 116.

As shown in FIG. 1, the upper surface 102a of the upper plate 102 is provided with a pin hole 119a into which a first pin 17a of the upper jig 12 described later (see FIGS. 9 and 10) is inserted to position the upper plate 102 at predetermined position with respect to the upper jig 12 by inserting the first pin 17a into the pin hole 119a.

Further, as shown in FIG. 5, the under surface 104b of the lower plate 104 is provided with a pin hole 119b into which a second pin 17b of the lower jig 14 described later (see FIGS. 9 and 11) is inserted to position the lower plate 104 at predetermined position with respect to the lower jig 14 by inserting the second pin 17b into the pin hole 119b. It is noted that the pin holes 119a and 119b are formed so as not penetrate through the upper plate 102 or the lower plate 104 and so as to close on their way. It suitably prevents an outer surface of the stacked coil 108 sandwiched between the upper and lower plates 102 and 104 from being damaged.

As shown in FIG. 5, the lower plate 104 is provided with a first winding securing section 110a having substantially a shape of L in transverse section and protruding in the radial outward direction to wind and secure a winding beginning portion of the wire rod 106 and a second winding securing section 110b having substantially a shape of L in transverse section to wind and secure a winding ending portion of the wire rod 106. It is noted that the first and second winding securing sections 110a and 110b are caulked respectively with a pair of terminals 152a and 152b (see FIG. 29) in a next process to electrically connect the winding beginning portion of the wire rod 106 with the winding ending portion thereof.

Further, as shown in FIG. 5, a rectangular plate portion 124 is integrally formed between the outer peripheral surface of the lower plate 104 and the first and second winding securing sections 110a and 110b. The plate portion 124 of the under surface 104b of the lower plate 104 is provided with a curved second guide groove 126 formed so as to guide the winding beginning portion of the wire rod 106 secured to the first winding securing section 110a from the first winding securing section 110a toward an outer peripheral part of the lower plate 104.

Still more, as shown in FIGS. 2, 5 and 6, an inner peripheral portion of the lower plate 104 is provided with a cylindrical projection 128 formed so as to slightly extend in the axial direction (at the upper and lower faces 104a and 104b of the lower plate 104). Further, as shown in FIG. 6, the upper surface 104a of the lower plate 104 is provided with a guide slope 130 formed as a concave groove in section that extends in a tangent direction of the cylindrical projection 128 to guide the winding beginning portion of the wire rod 106 from the outer peripheral portion of the lower plate 104 to the inner peripheral portion thereof. As shown in FIG. 20, the guide slope 130 is formed so as to have a slope (groove bottom) inclined by a predetermined angle so that a depth thereof is shallow on the inner peripheral side and is gradually deepened on the outer peripheral side.

One side wall 132 of the guide slope 130 substantially orthogonal to the slope described above is provided with two ribs 134 for example which are separated by a predetermined distance and bulge in a horizontal direction toward the slope as shown in FIG. 6. These ribs 134 abut the wire rod 106 guided along the guide slope 130 to block molten resin from being filled into the guide slope 130 when the wire rod 106 when the wound coil is molded in the following process. As a result, it becomes possible to suitably prevent the molten resin from entering the coil inner peripheral surface 120. It is noted that the number of the ribs 134 is not limited to be a plural number and may be one or more.

Still more, as shown in FIG. 5, the circular arc projection 114b of the lower plate 104 is provided with a notch 136 formed so as to anchor a weaving beginning portion of the weaving wire 116 and the other circular arc projection 114b is provided with another notch 136 formed so as to anchor a weaving ending portion of the weaving wire 116.

Figure 21:
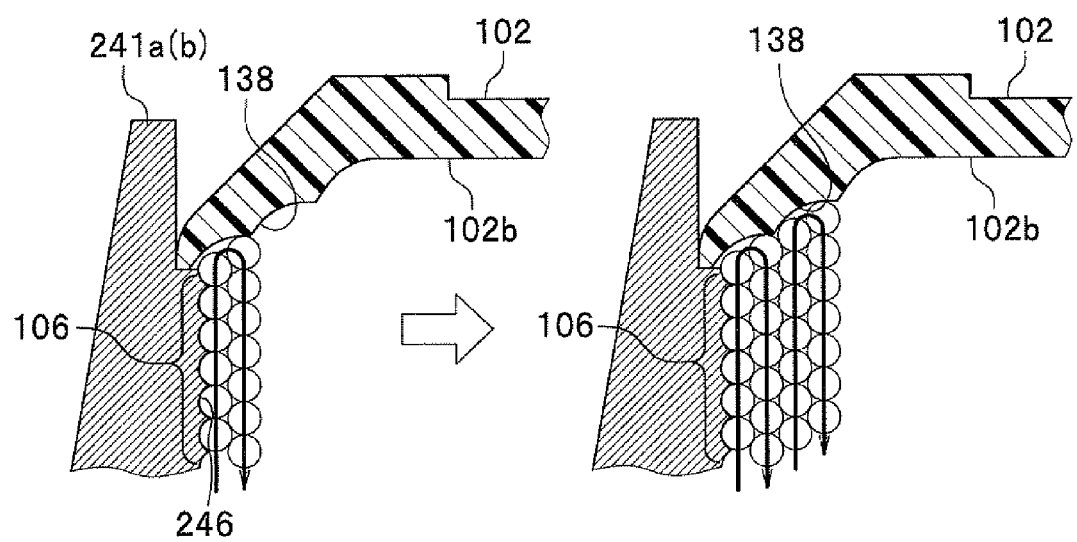
FIG. 21 is a partially longitudinal section view showing a state in which the wire rod is folded back and is stacked.

As shown in FIG. 21, the under surface 102b of the upper plate 102 facing the lower plate 104 is provided with third guide grooves 138, i.e., a plurality of grooves each having a circular arc in longitudinal section juncturally formed. The third guide groove 138 exhibits its function of guiding and aligning the wire rod 106 when the wire rod 106 is folded and is laminated into a plurality of levels.

Figure 8:
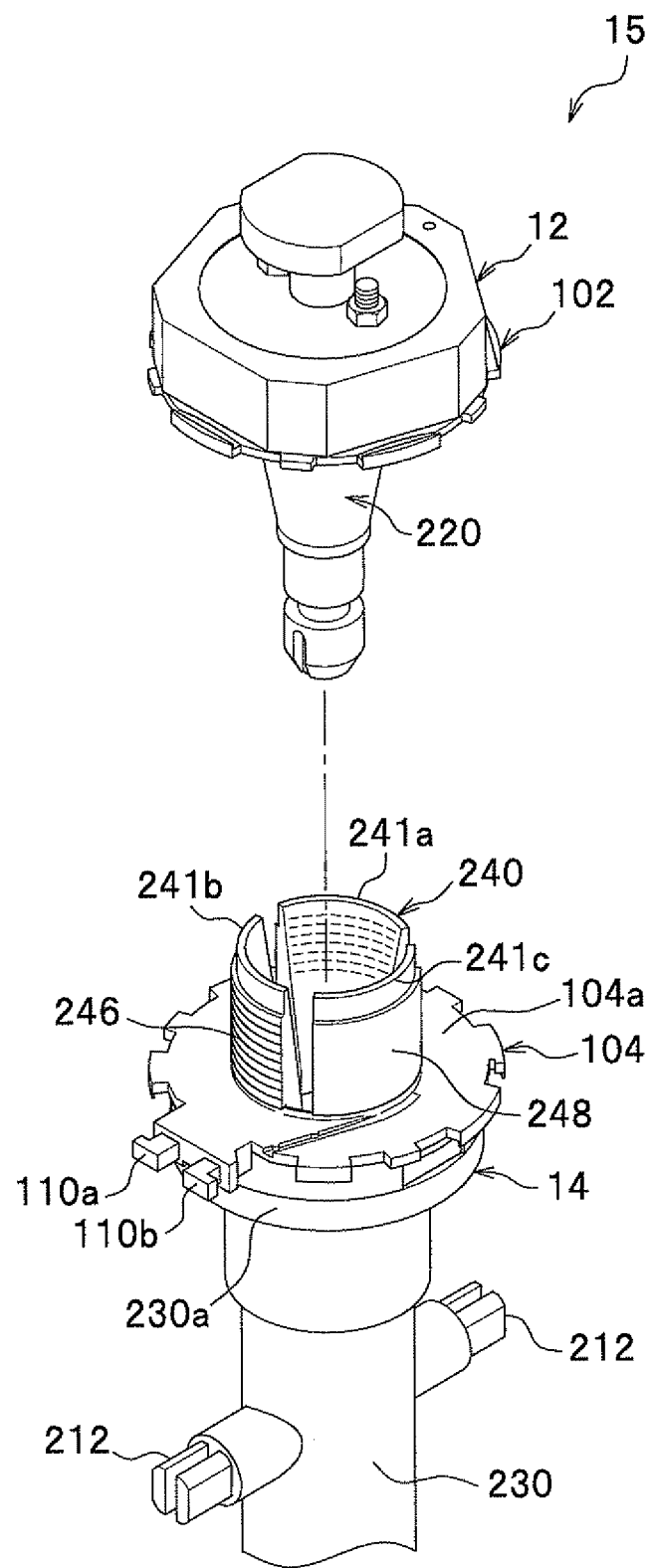
FIG. 8 is a partially omitted exploded perspective view of a coil winding device composing the coil winding system.

Next, the coil winding system 10 of the present embodiment will be explained with reference to FIGS. 7 and 8. FIG. 8 is a partially omitted exploded perspective view of a coil winding device composing the coil winding system.

This coil winding system 10 includes a coil winding device 15 composed of the upper jig 12 provided liftably along the vertical direction by means of an elevation mechanism not shown and a lower jig 14 supported on a base not shown rotatably along a direction of an arrow under a rotating and driving action of a motor M.

The coil winding system 10 also includes a nozzle 30 for feeding the wire rod 106 supplied from a wire rod supplying source 17 to the coil winding device 15, a triaxial actuator mechanism 32 composed of a plurality of assembled linear actuators to displace the nozzle 30 in triaxial directions of XYZ orthogonal from each other under a guiding action of a guide rail not shown and a tension device 34 for applying an adequate tension to the wire rod 106 fed from the nozzle 30. It is noted that the nozzle 30, the triaxial actuator mechanism 32 and the wire rod supplying source 17 function as a wire rod feeding means.

Figure 9:
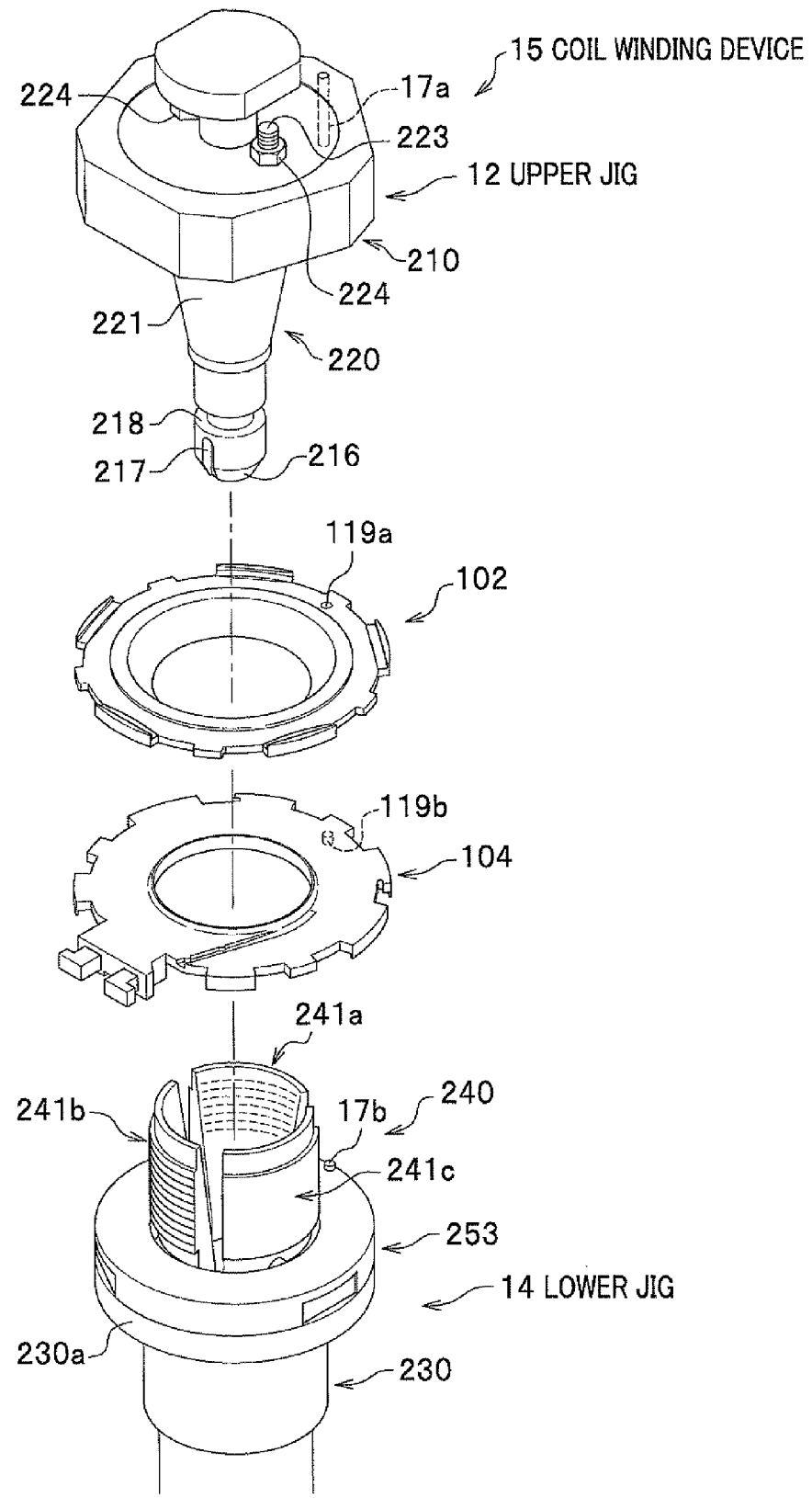
FIG. 9 is an exploded perspective view of the coil winding device.
Figure 10:
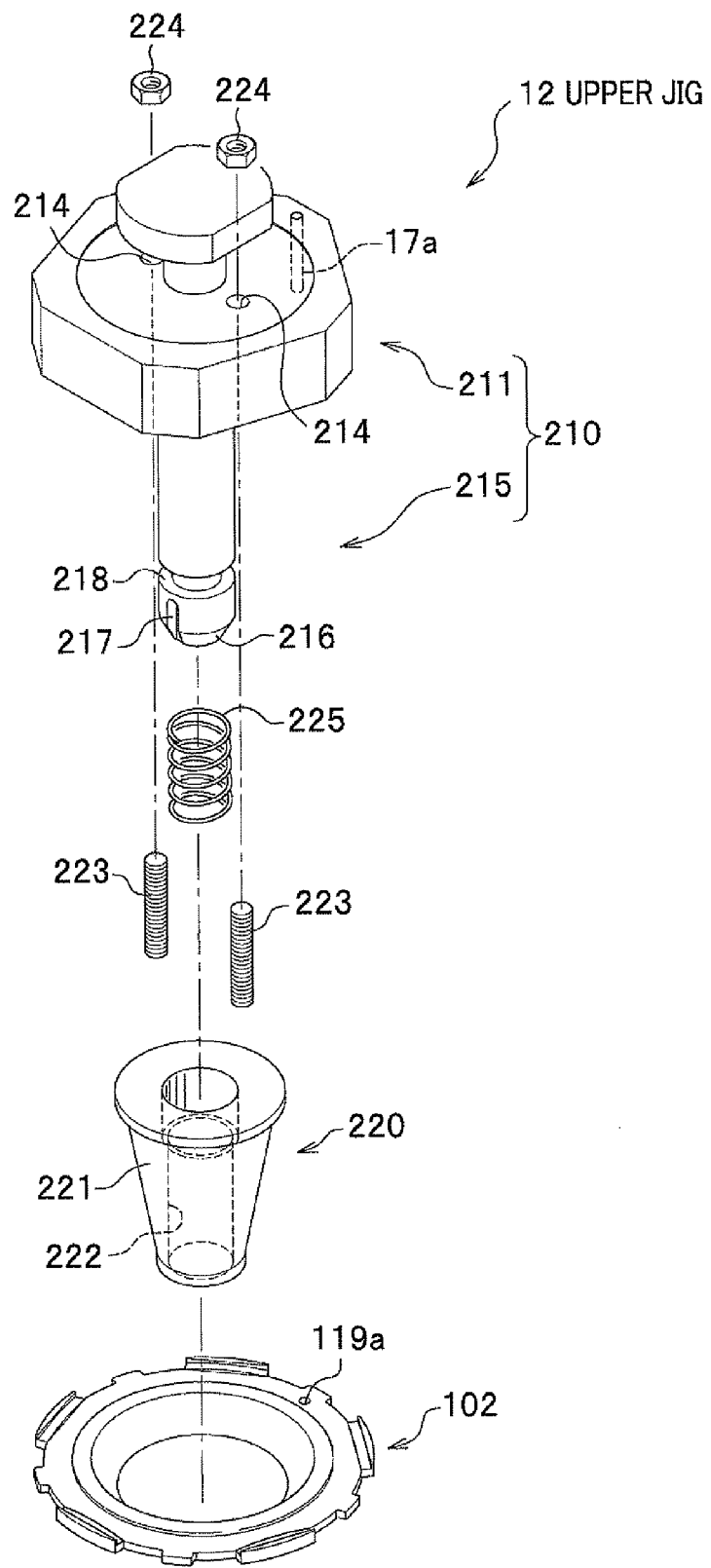
FIG. 10 is an exploded perspective view of an upper jig composing the coil winding device.
Figure 11:
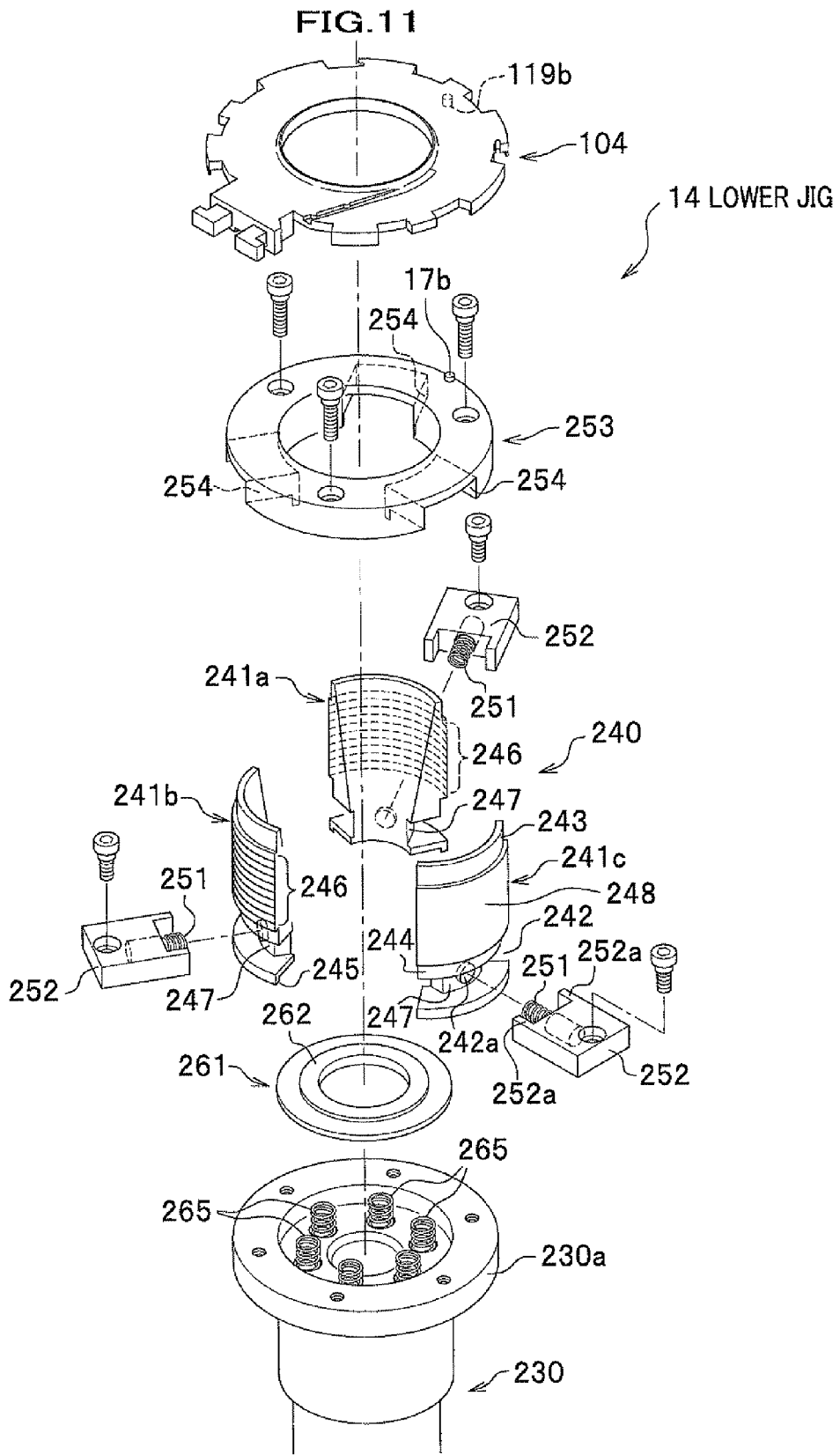
FIG. 11 is an exploded perspective view of a lower jig composing the coil winding device.
Figure 12:
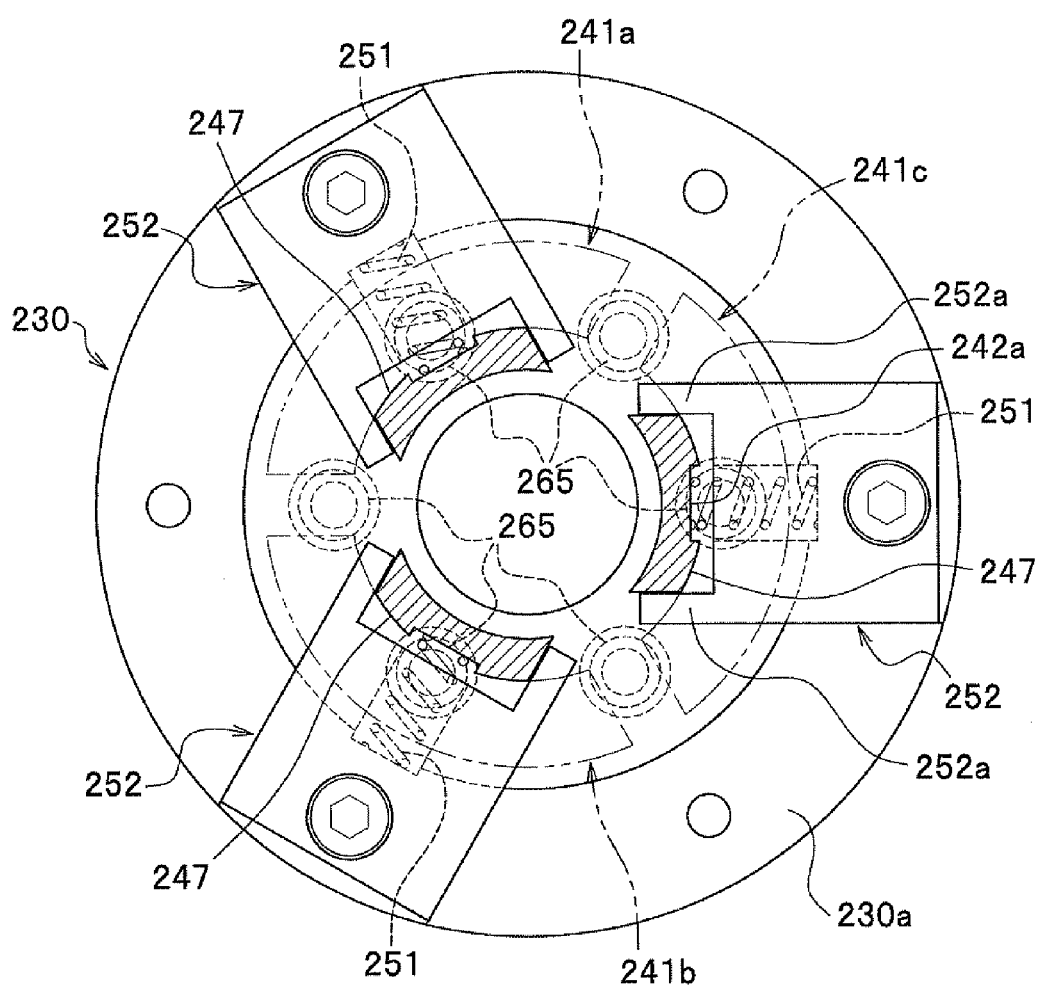
FIG. 12 is a partially sectional plan view of the lower jig from which an attachment plate is omitted.

FIG. 9 is an exploded perspective view of the coil winding device, FIG. 10 is an exploded perspective view of the upper jig composing the coil winding device, FIG. 11 is an exploded perspective view of the lower jig composing the coil winding device and FIG. 12 is a partially sectional plan view of the lower jig from which an attachment plate is omitted. As shown in FIGS. 9 and 10, the upper jig 12 is composed of a upper jig body 210 for attaching and latching the upper plate 102 and a tapered portion 220 that is inserted into an opening of a claw section 240 of the lower jig 14 described later to expand the claw section 240 (split claws).

As shown in FIG. 10, the upper jig body 210 has a thick disk-like attachment seat 211 having a attachment surface 211a (see FIGS. 13 through 15) formed so as to accommodate the upper surface 102a of the upper plate 102 and a insertion rod portion 215 extending downward perpendicularly from a center of the attachment seat 211.

The attachment seat 211 is liftably linked by means of the elevation mechanism not shown, is provided with the attachment surface 211a that abuts the upper surface 102a of the upper plate 102 at the under surface thereof and is provided with the first pin 17a protruding downward to relatively position the upper plate 102 fitted to the attaching surface 211a. It is noted that the upper plate 102 is attached to the attaching surface 211a of the attachment seat 211 by means of opening claws 213 (see FIG. 13) that open in the radial direction.

The insertion rod portion 215 is substantially a cylindrical column to be inserted into the claw section 240 of the lower jig 14 described later and has a ringed tapered surface 216 at a lower end thereof formed so as to be readily inserted.

The insertion rod portion 215 is also provided with a key groove 217 formed at the lower part thereof along the perpendicular direction so that a key 231 (see FIGS. 14 and 15) provided in the lower jig 14 is to be inserted therein. Thereby, relative position in the peripheral direction of the insertion rod portion 215 (the upper jig 12) and the lower jig 14 is determined.

Figure 15:
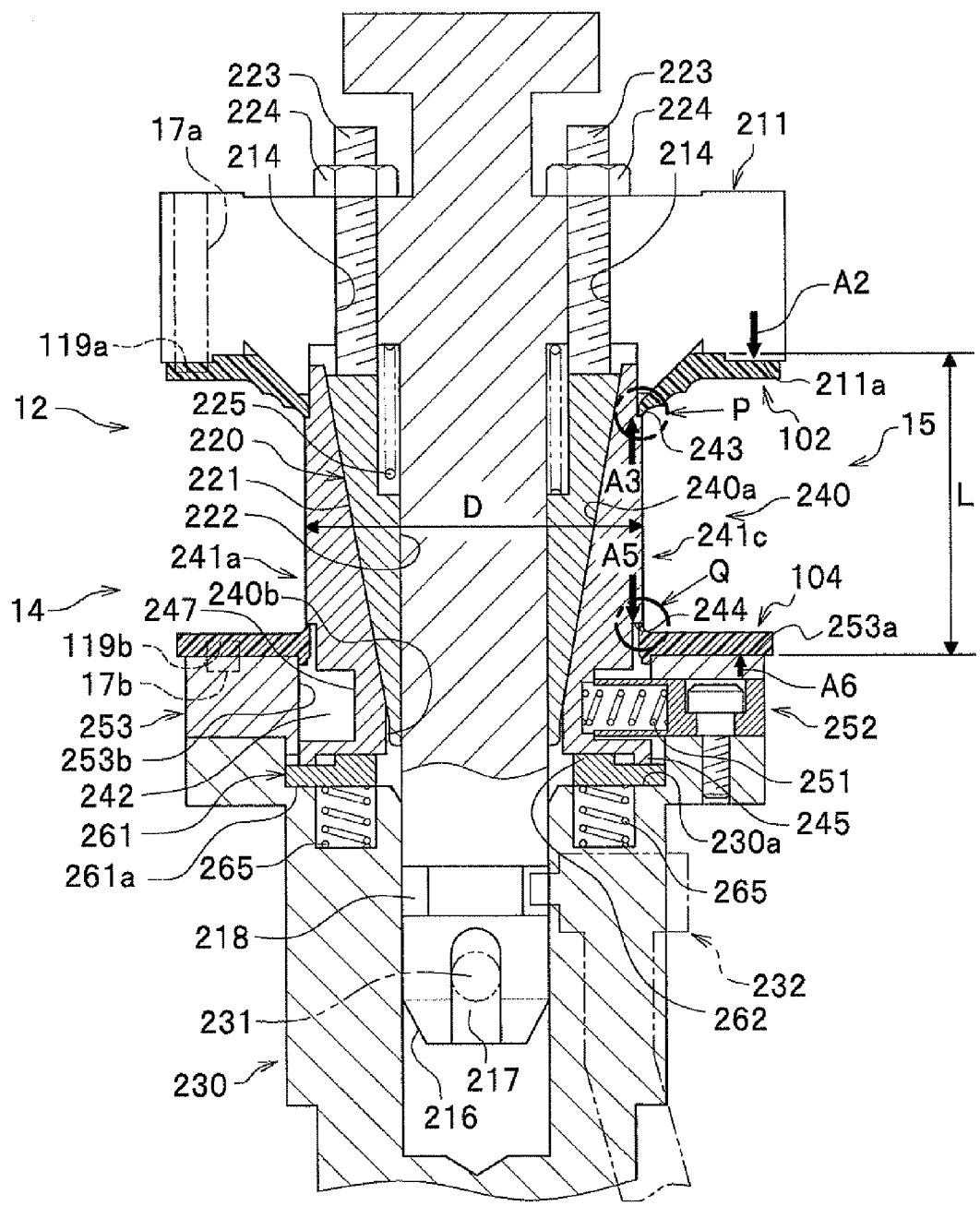
FIG. 15 is a longitudinal section view showing a state after when the upper jig has been inserted into the lower jig.

Still more, the insertion rod portion 215 is provided with a locking groove 218 around the lower part thereof so that a locking piece 232 of the lower jig 14 is inserted into the locking groove 218 when the upper jig 12 is inserted into the lower jig 14 (see FIG. 15). It prevents the upper jig 12 from slipping out after inserting the upper jig 12 into the lower jig 14. It is noted that the locking piece 232 is provided with a cylinder not shown at an underside thereof and the locked state is released when a piston rod of the cylinder presses a lower part of the locking piece 232 and the locking piece 232 separates from the locking groove 218.

The tapered portion 220 is formed substantially into an inverted truncated cone so as to be inserted into the claw section 240 in succession after inserting the lower part of the insertion rod portion 215 into the claw section 240 and has a tapered surface 221 around a surface thereof. The tapered portion 220 is provided with an insertion hole 222 that penetrates through the tapered portion 220 in the axial direction and the insertion rod portion 215 is inserted through the insertion hole 222.

There are also provided with two threaded rods 223 above the tapered portion 220. The two threaded rods 223 are to be screwed into the two screw holes 214 of the attachment seat 211. They are arranged such that position of lower ends of the two threaded rods 223 may be controlled by fastening nuts 224 to upper ends of the respective threaded rods 223 and by locking the nuts 224 to the attachment seat 211.

The lower ends of the threaded rods 223 butt an upper surface of the tapered portion 220, so that the tapered portion 220 is set at predetermined level controlled by height of the threaded rods 223 with respect to the attachment seat 211. It is noted that a key not shown guides the tapered portion 220 with respect to the body 210 of the upper jig in the perpendicular direction and holds the tapered portion 220 so as not to slip out of the body 210.

A compression coil spring 225 is interposed between the tapered portion 220 and the attachment seat 211 so that the tapered surface 221 of the tapered portion 220 suitably butts the tapered surface 240a of the claw section 240 (see FIG. 13) when the upper jig 12 is inserted into the claw section 240.

As shown in FIGS. 8 and 11, the lower jig 14 has a substantially cylindrical body 230 of the lower jig, a pedestal 230a provided on the lower jig body 230 described above and is composed of a flange whose diameter is enlarged, a ringed plate 261 inserted within a circular concave portion formed in the pedestal 230a, the claw section 240 having the first through third split claws 241a through 241c displaceably supported along the radial direction of the ringed plate 261 and whose diameter is enlarged along the radial outward direction when the tapered portion 220 of the upper jig 12 is inserted and a pair of latching sections 212 that protrude in directions orthogonal to an axial line of the lower jig body 230 for latching one winding starting end portion of the wire rod 106 and the weaving wire 116.

The lower jig 14 also has three radial springs 251 that press the first through third split claws 241a through 241c of the claw section 240 in radial inner directions by their spring force and six thrust springs 265 that press the claw section 240 upward by their spring force as shown in FIG. 11.

The lower jig body 230 is arranged so that it is appropriately rotated by the motor M. The lower jig body 230 is provided with the key 231 that is inserted into the key groove 217 of the upper jig 12 and the locking piece 232 that engages with the locking groove 218 of the upper jig 12 (see FIG. 15).

Figure 13:
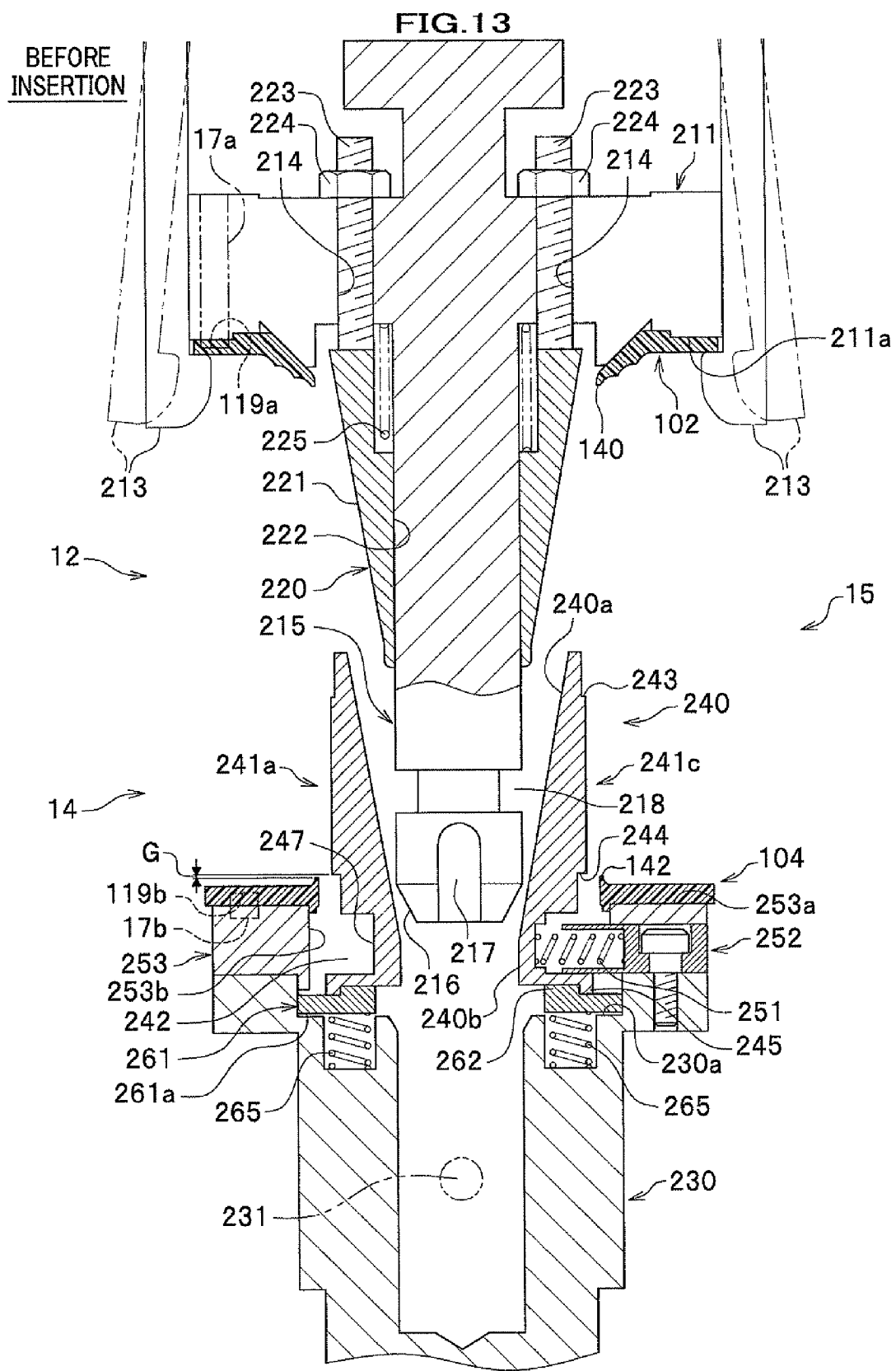
FIG. 13 is a longitudinal section view showing a state before the upper jig is inserted into the lower jig.
Figure 14:
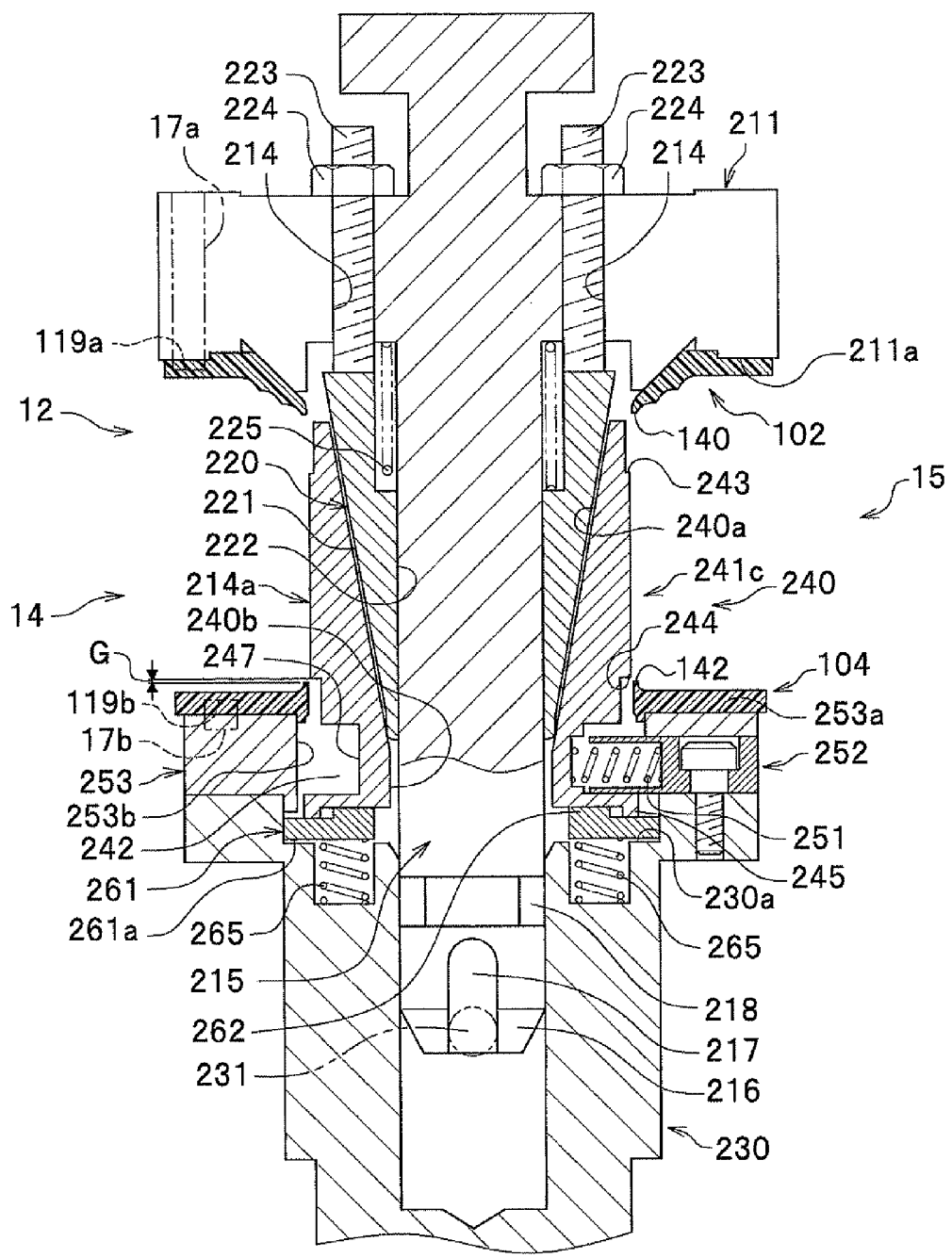
FIG. 14 is a longitudinal section view showing a state during when the upper jig is inserted into the lower jig.

FIGS. 13, 14 and 15 are longitudinal section views showing states before the upper jig is inserted into the lower jig, during when the upper jig is inserted into the lower jig and after when the upper jig has been inserted into the lower jig. Although the claw section 240 is cylindrical when it is closed, it has the first through third split claws 241a through 241c whose horizontal section is circular arc when it is split in the peripheral direction. Each of the first through third split claws 241a through 241c is arranged to be slidable along the radial direction and is pressed toward the radial inner direction by the radial spring 251.

That is, when the upper jig 12 is not inserted into the claw section 240, each of the first through third split claws 241a through 241c is pressed toward the radial inner direction by the spring force of the radial spring 251 and the claw section 240 is closed like a cylinder with its diameter reduced. When the upper jig 12 is inserted into the claw section 240 on the other hand, each of the first through third split claws 241a through 241c is displaced in the radial outer direction by going against the spring force o f the radial spring 251 and the claw section 240 is opened with its diameter enlarged.

An inner peripheral surface of each of the first through third split claws 241a through 241c is formed to be a tapered surface 240a whose diameter is gradually reduced on the lower side as shown in FIG. 13. An inner peripheral surface 240b whose inner diameter is constant is formed below the tapered surface 240a.

Each of the first through third split claws 241a through 241c is provided with a peripheral groove 242 along the peripheral direction on the lower side of the outer peripheral surface thereof as shown in FIG. 11. A narrow and constricted peripheral groove 242 is also provided at the part where the peripheral groove 242 of each of the first through third split claws 241a through 241c is formed such that a pair of protrusions 252a of a guide member 252 described later slidably pinch the neck portion 247. The neck portion 247 is also provided with a spring hole 242a by an outer side face thereof so that the radial spring 251 is fitted into the spring hole 242a to position the guide member 252.

Figure 16:
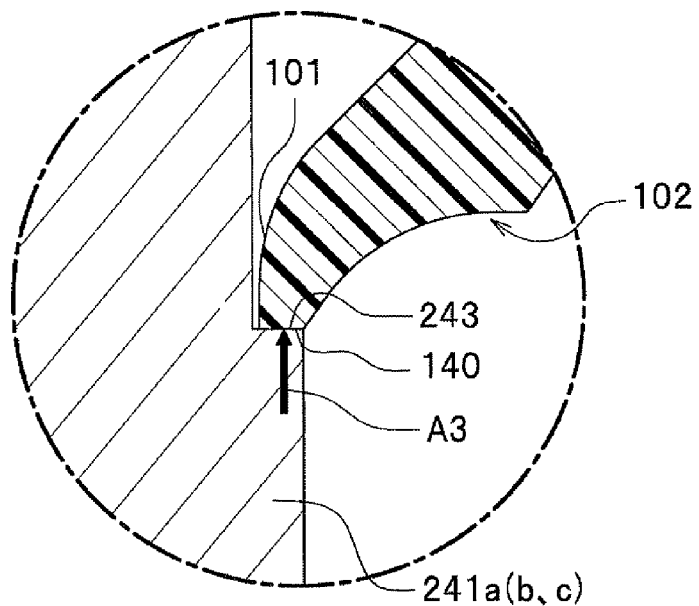
FIG. 16 is an enlarged longitudinal section view of a region denoted by a reference character P in FIG. 15.
Figure 17:
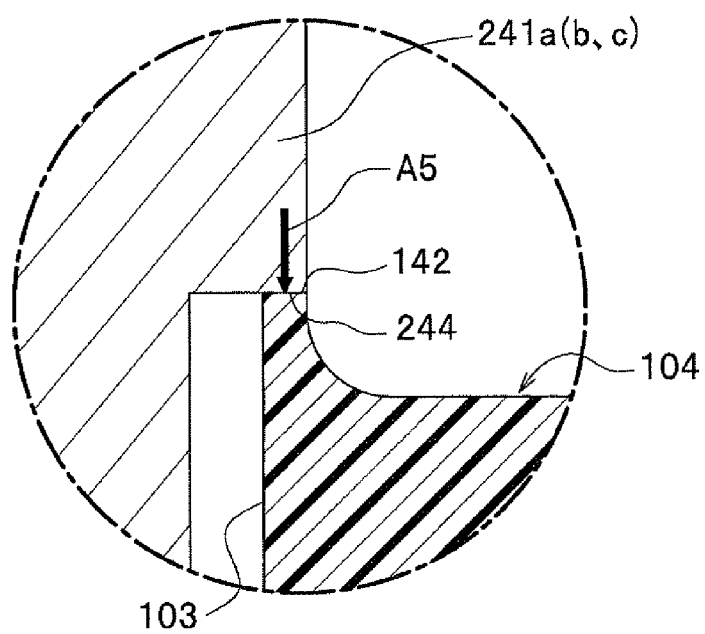
FIG. 17 is an enlarged longitudinal section view of a region denoted by a reference character Q in FIG. 15.

Each of the first through third split claws 241a through 241c is provided with a first stepped portion 243 that extends in the peripheral direction on an upper part of the outer peripheral surface thereof and a second stepped portion 244 that extends in the peripheral direction on a lower part of the outer peripheral surface thereof. The first and second stepped portions 243 and 244 are provided respectively at positions separated by a predetermined distance along the axial direction of the claw section 240. Here, the first stepped portion 243 is arranged so as to butt an inner lower face 140 of the upper plate 102 as shown in FIG. 16 and the second stepped portion 244 is arranged so as to butt an inner upper surface 142 of the lower plate 104 as shown in FIG. 17, respectively, when the claw section 240 is opened. FIGS. 16 and 17 are enlarged longitudinal section views of regions denoted by reference characters P and Q, respectively, in FIG. 15.

Each of the first through third split claws 241a through 241c is provided with a latching flange 245 formed into a circular arc when seen horizontally in section at the lower end portion thereof. The latching flange 245 is arranged so as to be latched by a raised portion 262 of the ringed plate 261 when the claw section 240 is closed (see FIG. 13).

As shown in FIG. 7, a peripheral surface of the claw section 240 that functions as a wired section to be wound by the wire rod 106 is provided so as to be exposed between the upper and lower plates 102 and 104 separated by the predetermined distance along the vertical direction when the upper jig 12 is coaxially assembled with the lower jig 14. This peripheral surface of the claw section 240 is formed by the peripheral surfaces of the first through third split claws 241a through 241c separated with clearances of a predetermined angle in the peripheral direction.

Figure 18:
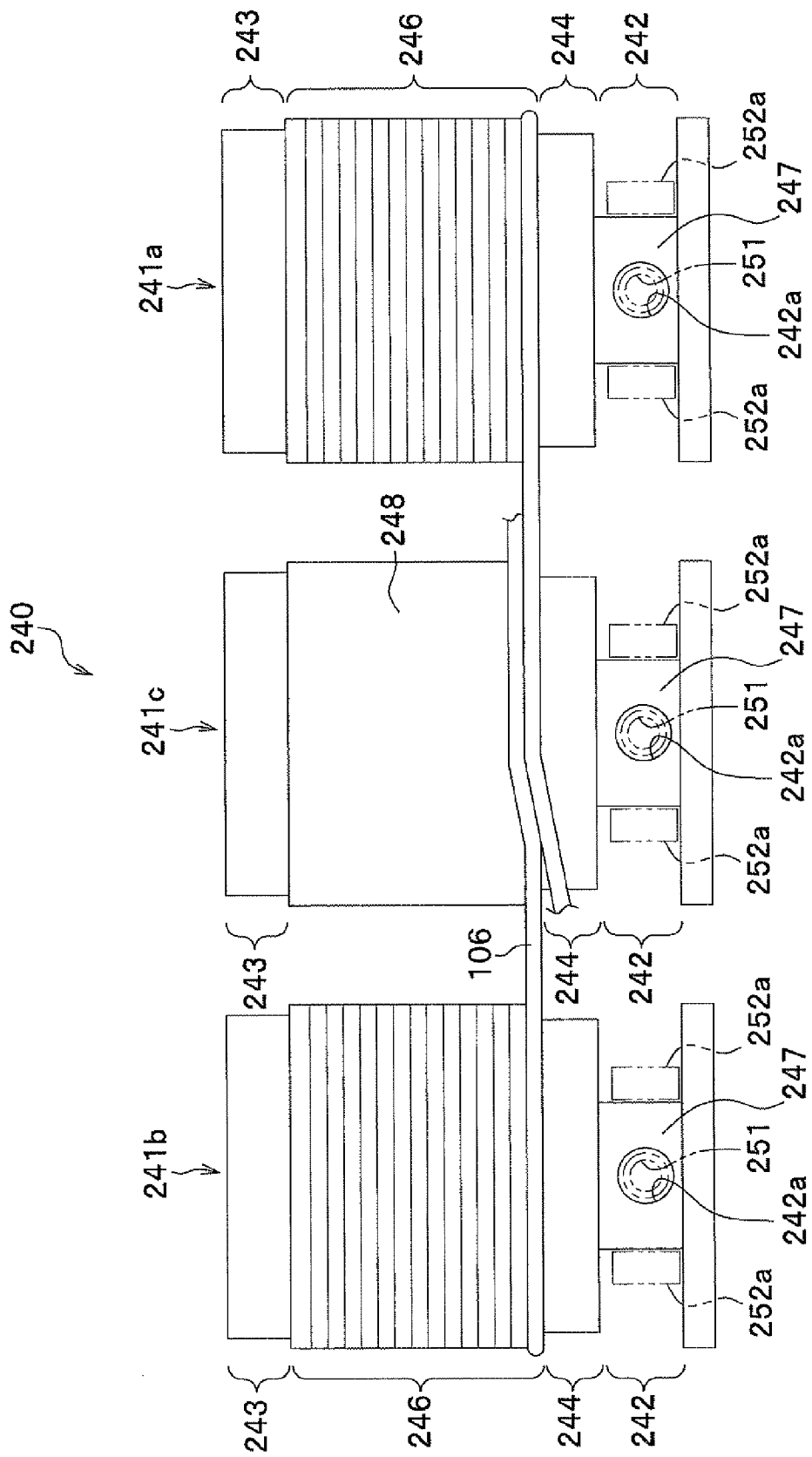
FIG. 18 shows a state laid out in a peripheral direction in which a wire rod is wound around claws.

Here, a plurality of chases 246 that extends in parallel along the horizontal direction and that guides the wire rod 106 wound around the peripheral surface is formed around the peripheral surface of the first and second split claws 241a and 241b as shown in FIG. 18. The peripheral surface of the third split claw 241c is a smoothly-shaped flat surface 248 around which no irregularity is formed. This smoothly-shaped flat surface 248 achieves a smooth shift of the wire rod 106 wound around the peripheral surface in transferring to a next row.

As shown in FIG. 12, the three radial springs 251 are arranged so as to be attached on the upper surface of the pedestal 230a of the lower jig body 230 through the guide members 252, when seen horizontally, by being separated equiangularly (every) 120° in the peripheral direction and to be guided along the radial direction by the guide members 252.

The guide member 252 is provided, at one end portion thereof along the axial direction, with the pair of protrusions 252a that protrude substantially in parallel toward the first through third split claws 241a through 241c. The pair of protrusions 252a is arranged so as to be inserted into the peripheral groove 242 of each of the first through third split claws 241a through 241c and to slidably sandwich the neck portion 247 of each of the first through third split claws 241a through 241c. Thereby, each of the first through third split claws 241a through 241c is provided slidably on the upper part of the lower jig body 230 along the radial direction.

As shown in FIG. 11, a ringed attachment plate 253 on which the lower plate 104 is fitted is fixed on the guide member 252. This attachment plate 253 is provided, on an upper surface thereof, with a second pin 17b for positioning the lower plate 104 at predetermined position with respect to the lower jig 14 and with rectangular concave portions 254 into which the guide members 252 are fitted.

As shown in FIG. 12, the six thrust springs 265 are compression coil springs for example and are arranged so as to be fitted into spring holes formed within the circular concave portion of the pedestal 230a of the lower jig body 230 and so as to be separated equiangularly (every 60°) along the peripheral direction.

As shown in FIGS. 11 and 13, the ringed plate 261 is disposed on and is uniformly supported by the six thrust springs 265. The claw section 240 is disposed on the upper surface of the ringed plate 261. That is, the six thrust springs 265 are arranged so as to press the claw section 240 upward through the ringed plate 261.

The ringed plate 261 is provided, at an inner peripheral portion thereof, with the raised portion 262 thickly formed as compared to an outer peripheral portion thereof. That is, the raised portion 262 is provided so that it butts and latches the latching flange 245 of each of the first through third split claws 241a through 241c when the upper jig 12 is not inserted into the claw section 240 and the claw section 240 is closed. That is, the raised portion 262 functions as a stopper for controlling the displacement of the first through third split claws 241a through 241c in the radial inner direction when the claw section 240 is closed.

The coil winding system 10 of the present embodiment is constructed basically as described above. Next, operations of the coil winding system 10 will be explained below.

A preliminary process carried out before winding the wire rod 106 will be briefly explained at first. The upper jig 12 attached with the upper plate 102 and coaxially separated from the lower jig 14 attached with the lower plate 104 as shown in FIG. 8 is lowered toward the lower jig 14 by means of the elevation mechanism not shown to assemble the upper jig 12 with the lower jig 14.

Here, the tapered portion 220 of the upper jig 12 is inserted into the claw section 240 and presses the first through third split claws 241a through 241c in the radial outward direction. Then, the first through third split claws 241a through 241c slide in the radial outward direction and the upper jig 12 is assembled with the lower jig 14. When the upper and lower jigs 12 and 14 are assembled, the upper and lower plates 102 and 104 are held while separating from each other by a predetermined distance. Thus, the preliminary process for winding the wire rod 106 around the peripheral surface (wound section) of the claw section 240 is completed.

Operations for assembling the upper jig 12 with the lower jig 14 will be explained in detail below with reference to FIGS. 13 through 17.

As shown in FIG. 13, the upper plate 102 is attached to the under surface (the attaching surface 211a) of the attachment seat 211 of the upper jig 12 while aligning the first pin 17a with the pin hole 119a. Meanwhile, the lower plate 104 is attached to the upper surface 253a of the attachment plate 253 of the lower jig 14 while aligning the second pin 17b with the pin hole 119b.

After attaching the upper and lower plates 102 and 104 respectively to the upper and lower jigs 12 and 14, the upper jig 12 is lowered by the elevation mechanism not shown while aligning the key 231 of the lower jig 14 with the key groove 217 of the upper jig 12 to insert the insertion rod portion 215 of the upper jig 12 into the opening of the claw section 240 of the lower jig 14.

When the insertion rod portion 215 butts the inner peripheral surface 240b of the first through third split claws 241a through 241c after that, the claw section 240 starts open because the first through third split claws 241a through 241c slide in the radial outward direction by going against the spring force of the radial spring 251.

When the tapered surface 221 of the tapered portion 220 is lowered further while butting the tapered surface 240a of the first through third split claws 241a through 241c, each of the first through third split claws 241a through 241c slides further in the radial outward direction. Then, when the latching flange 245 of each of the first through third split claws 241a through 241c butts an inner peripheral surface 253b of the attachment plate 253 as shown in FIG. 15, the sliding movement of each of the first through third split claws 241a through 241c in the radial outward direction is restricted.

Here, the first through third split claws 241a through 241c are pressed by the respective thrust springs 265 through the ringed plate 261, so that they may be pressed upward uniformly and a gap G is created between the second stepped portion 244 on the lower side of the first through third split claws 241a through 241c and the inner peripheral upper end surface 142 of the lower plate 104 as shown in FIGS. 13 and 14.

When the upper jig 12 is lowered further and the under surface 261a of the ringed plate 261 butts the upper surface 230a of the lower jig body 230, the upper jig 12 stops from being lowered. At this time, each of the first through third split claws 241a through 241c slides downward along with the lowering movement of the upper jig 12 by going against the pressing force of each thrust spring 265.

Here, the inner peripheral lower end surface 140 of the upper plate 102 butts the first stepped portion 243 on the upper side of the first through third split claws 241a through 241c as shown in FIG. 16 in the upper region P of the first through third split claws 241a through 241c. Meanwhile, the inner peripheral upper end surface 142 of the lower plate 104 butts the second stepped portion 244 on the lower side of the first through third split claws 241a through 241c as shown in FIG. 17 in the lower region Q of the first through third split claws 241a through 241c.

Specifically, because each of the first through third split claws 241a through 241c is pressed upward in advance by the spring force of the thrust spring 265 and the gap G is created as shown in FIGS. 13 and 14, the second stepped portion 244 on the lower side butts the inner peripheral upper end surface 142 of the lower plate 104 after when the inner peripheral upper end surface 142 of the lower plate 104 is positioned right under the second stepped portion 244 of the lower side of each of the first through third split claws 241a through 241c in the lower region Q.

As a result, it becomes possible to prevent such a trouble that an outer peripheral surface of a split claw not shown that has no thrust spring 265 and slides only in the radial outward direction otherwise butts an inner peripheral surface 103a of the lower plate 104 (see FIG. 17) for example.

Thus the upper jig 12 is coaxially assembled with the lower jig 14 and is locked by the locking piece 232 of the lower jig 14 that engages with the locking groove 218.

In the state when the upper jig 12 is thus assembled with the lower jig 14, an axial length L between the under surface (the attaching surface 211a) of the attachment seat 211 in the upper jig 12 and the upper surface 253a of the attachment plate 253 in the lower jig 14 is at a predetermined value as shown in FIG. 15. Position of enlarged outer periphery of each of the first through third split claws 241a through 241c, i.e., a radial length D, is also set at a predetermined value.

Here, respective levels in the axial direction of the first stepped portion 243 formed on the upper side and of the second stepped portion 244 formed on the lower side of the first through third split claws 241a through 241c are set at position where compression load is applied respectively by the inner peripheral lower end surface 140 of the upper plate 102 and the inner peripheral upper end surface 142 of the lower plate 104.

As a result, the upper plate 102 is sandwiched at the predetermined position, i.e., restrained, between the under surface (the attaching surface 211a) of the attachment seat 211 and the first stepped portion 243 of the first through third split claws 241a through 241c and the lower plate 104 is restrained between the upper surface 253a of the attachment plate 253 and the second stepped portion 244 of the first through third split claws 241a through 241c.

More specifically, the upper plate 102 receives pressure A2 that perpendicularly presses down the upper surface of the upper plate 102 from the under surface (the attaching surface 211a) of the attachment seat 211 (see FIG. 15) and in the same time, receives a compression load (pressure A3: see FIGS. 15 and 16) that presses the inner peripheral lower end surface 140 of the upper plate 102 upward in the axial direction from the first stepped portion 243 of the first through third split claws 241a through 241c.

Still more, the lower plate 104 receives pressure A6 that perpendicularly presses up the under surface of the lower plate 104 from the upper surface 253a of the attachment plate 253 (see FIG. 15) and in the same time, receives a compression load (pressure A5: see FIGS. 15 and 17) that presses the inner peripheral upper end surface 142 of the lower plate 104 downward in the axial direction from the second stepped portion 244 of the first through third split claws 241a through 241c. Then, a predetermined clearance is formed between the first through third split claws 241a through 241c and the through hole 103 of the lower plate 104 as shown in FIG. 17.

In the state in which the upper jig 12 is thus assembled with the lower jig 14, the upper and lower plates 102 and 104 are restrained at the predetermined position with respect to the opened claw section 240 and the distance between the upper and lower plates 102 and 104 is set at a predetermined width.

In other words, because the outer peripheral surface of the claw section 240 becomes a core, the upper plate 102 becomes an upper flange and the lower plate 104 becomes a lower flange, it becomes possible to form a structure similar to a bobbin having upper and lower flanges, i.e., an imaginary bobbin, and to readily wind the wire rod 106. Thereby, it becomes possible to wind the wire rod 106 neatly between the upper and lower plates 102 and 104 and to obtain the stacked coil 108 whose winding formation is not distorted, i.e., in which the wire rods 106 are well arrayed in the axial direction.

In succession, a method for winding the wire rod 106 between the upper and lower plates 102 and 104 held by the upper and lower jigs 12 and 14 as described above will be explained. FIG. 18 shows a state laid out in the peripheral direction in which the wire rod is wound around claws, FIGS. 19A through 19C are partially omitted perspective views showing a sequence how the wire rod is wound around the claw section provided between the upper and lower plates and FIG. 20 is a partially cut-away side view showing a state when the wire rod is wound around the first through third split claws composing the claw section by representing peripheral surfaces of the first through third split claws in flat for convenience sake.

First, in the state in which the motor M is powerless and the upper and lower jigs 12 and 14 coaxially assembled are at rest, the nozzle 30 is displaced under the driving action of the triaxial actuator mechanism 32 to latch one winding starting end of the wire rod 106 fed from the nozzle 30 to the latching section 212 of the lower jig body 230. Then, as shown in FIG. 19A, the wire rod 106 is wound once around an outer peripheral surface of a first winding securing section 110a provided on the left side of the lower plate 104 from the lower side thereof clockwise as shown by arrows a1 and a2 in the figure. It is noted that the wire rod 106 fed from the nozzle 30 is tensioned adequately by the tension device 34, so that it is possible to suitably prevent the wound wire rod 106 from becoming loose.

Next, the nozzle 30 is displaced along the horizontal direction under the driving action of the triaxial actuator mechanism 32 to insert the wire rod 106 along a second guide groove 126 formed at an under surface of a second winding securing section 110b on the right side of the lower plate 104 as shown in a partial perspective view in FIG. 19A. Then, the wire rod 106 is guided from the outer peripheral portion to the inner peripheral portion of the lower plate 104 so that it is guided along the guide slope 130 formed on the upper surface 104a of the lower plate 104.

When the wire rod 106 is guided along the slope of the guide slope 130 and reaches a lowest part of the flat surface 248 of the third split claw 241c, the motor M is actuated to rotate the upper and lower jigs 12 and 14 integrally in a direction of an arrow A. Thereby, the wire rod 106 is guided by the groove 246 of the first and second split claws 241a and 241b and reaches again the flat surface 248 of the third split claw 241c as shown in FIG. 20. At this time, because the peripheral surface of the third split claw 241c is formed by the flat surface 248 and does not restrain the winding direction of the wire rod 106 at all, it can shift the wire rod 106 to a next row smoothly.

The nozzle 30 is also displaced upward and the wire rod 106 is wound by plural times along the direction of rows of the peripheral surfaces of the first through third split claws 241a through 241c (axial direction) as indicated by an arrow a4 (see FIG. 19B). Because the nozzle 30 reciprocates along the axial direction, the wire rod 106 is sequentially laminated in the radial direction of the peripheral surface of the claw section 240 as shown in FIG. 19c.

After forming the stacked coil 108 composed of a plurality of levels of the wire rod 106 fed by rotating the upper and lower jigs 12 and 14 in a body and reciprocating the nozzle 30 by a plurality of times between the lower plate 104 and the upper plate 102, the winding ending portion of the wire rod 106 is guided from the inner peripheral portion to the outer peripheral portion of the upper surface 104a of the lower plate 104 and is wound once an outer peripheral surface of the second winding securing section 110b on the right side of the lower plate 104 from above clockwise as indicated by arrows a5 through a7 in FIG. 19C in the state when the rotation of the upper and lower jigs 12 and 14 is stopped. Then, the winding ending portion of the wire rod 106 is cut by a cutter means not shown.

Figure 30:
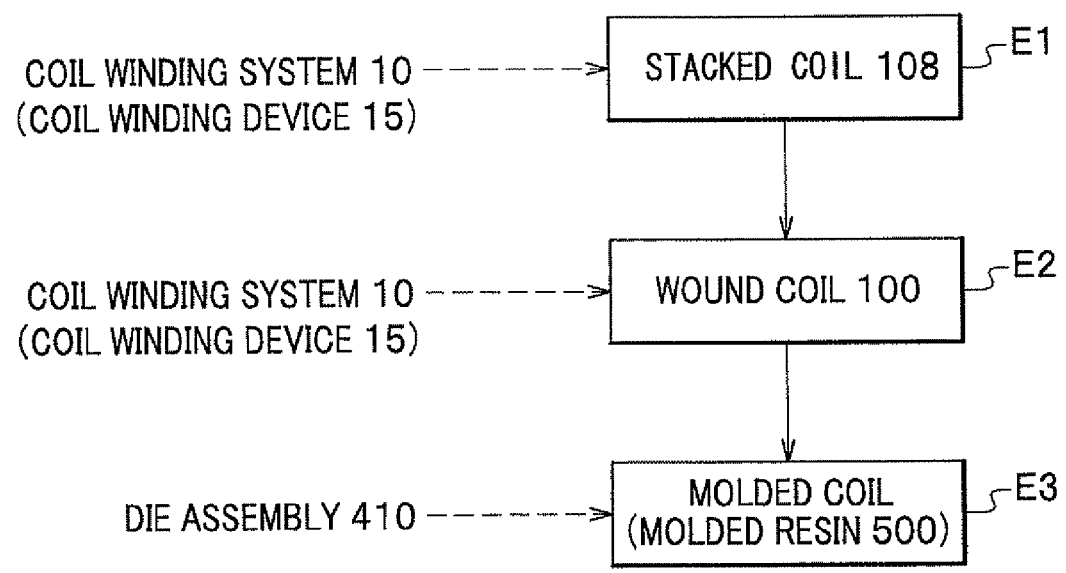
FIG. 30 is a block diagram showing steps of fabricating the molded coil.

Thus, in the state in which the upper and lower jigs 12 and 14 are coaxially assembled and the upper and lower plates 102 and 104 are separated by the predetermined distance on the claw section 240, the stacked coil 108 in which the wire rod 106 is neatly wound and is arrayed in the axial direction may be obtained between the upper and lower plates 102 and 104 that are set to have the predetermined width (see a block E in FIG. 30).

Still more, because the winding beginning and ending portions of the stacked coil 108 exposed to the outside are secured respectively by the adjoining first and second winding securing sections 110a and 110b and are disposed in cross by being separated respectively at the upper and lower surfaces of the plate portion 124 of the lower plate 104, it becomes possible to secure isolation quality of the stacked coil 108 including the winding beginning and ending portions.

Next, a method for weaving the weaving wire 116 for vertically holding the stacked coil 108 composed of the bobbinless coil will be explained below with reference to FIG. 22. It is noted that how one weaving beginning end of the weaving wire 116 is secured to the latching section 212 is the same with the case of forming the stacked coil 108 by winding the wire rod 106, its explanation will be omitted here. Still more, although the following explanation will be made by using the wire rod 106 (conductive line) fed from the nozzle 30, the invention is not limited to that and another wire rod beside the conductive line may be used.

Figure 22:
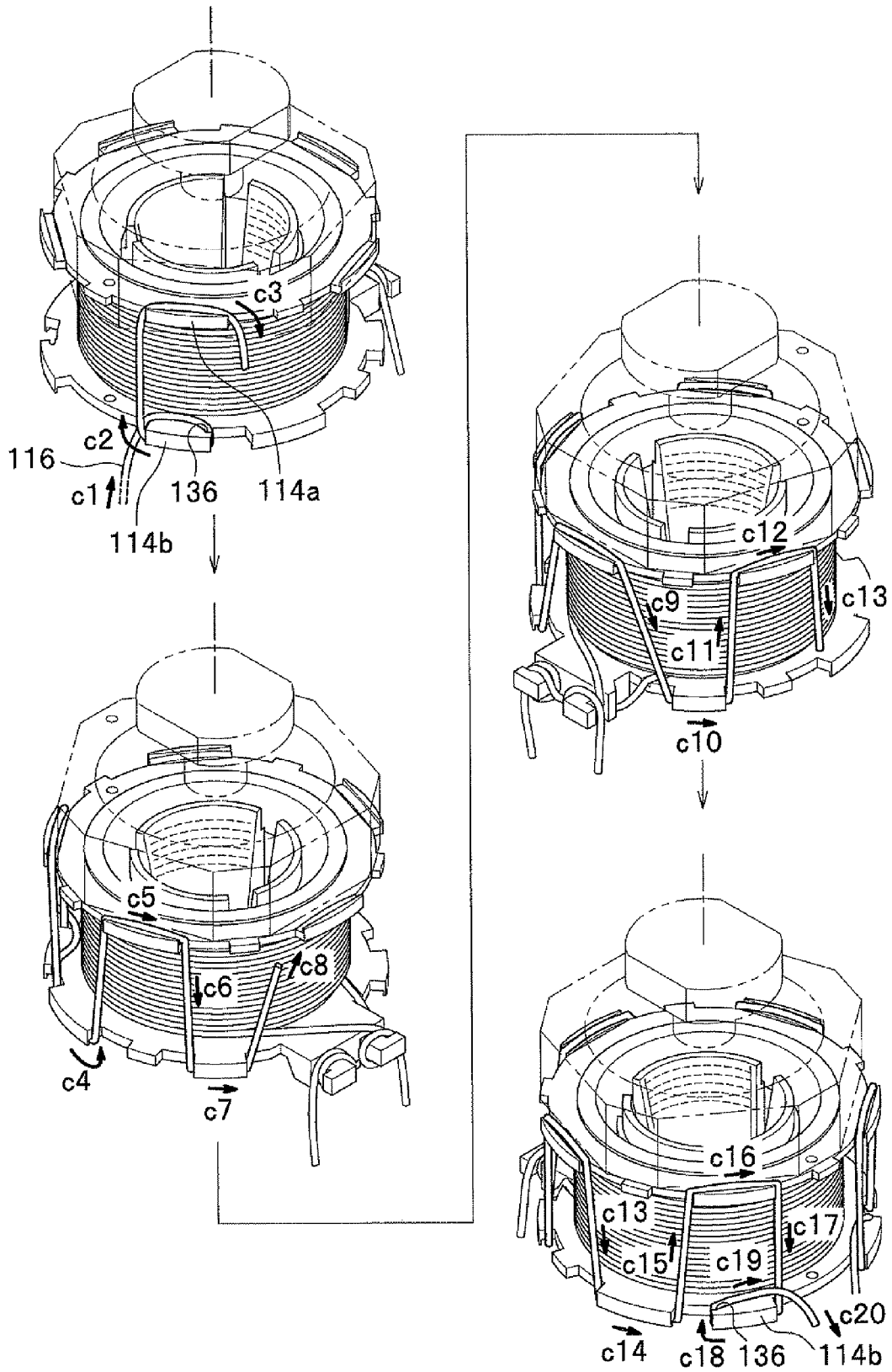
FIG. 22 is a perspective view showing states of weaving circular arc projections formed respectively around an outer peripheral portion of the upper and lower plates by a weaving wire in an elapsed time-series manner.

As indicated by arrows c1 through c3 in FIG. 22, the weaving beginning portion of the weaving wire 116 is wound once around the outer peripheral surface of the circular arc projection 114b of the lower plate 104 from the lower side clockwise and then the weaving wire 116 is engaged with the first guide groove 122 (see FIG. 3) of the circular arc projection 114a of the upper plate 102. Because the circular arc projection 114b of the lower plate 104 is provided with a notch portion 136 formed so as to secure the weaving beginning portion of the weaving wire 116, the notch portion 136 smoothly secures the weaving beginning portion of the weaving wire 116 at this time.

Next, the weaving wire 116 is woven sequentially along the first guide groove 122 of the circular arc projection 114b of the lower plate 104 and the first guide groove 122 of the circular arc projection 114b of the upper plate 102 that are disposed alternately along the peripheral direction so as not to be superimposed in the vertical direction as indicated by arrows c4 through c17 while reciprocating the nozzle 30 in the vertical direction in the state in which the upper and lower jigs 12 and 14 are rotated in a body along the peripheral direction under the driving action of the motor M. It is noted that the motor M is controlled by a controller not shown and is normally and inversely rotated appropriately to adequately tension the weaving wire 116 woven along the circular arc projections 114a and 114b of the upper and lower plates 102 and 104.

Here, because the circular arc projection 114a of the upper plate 102 and the circular arc projection 114b of the lower plate 104, i.e., the portions where the weaving wire 116 engages, are disposed alternately from each other in zigzag in the peripheral direction, it is possible to suitably prevent the upper and lower plates 102 and 104 from being dislocated with respect to the rotating direction thereof.

The weaving wire 116 woven between the upper and lower plates 102 and 104 extends substantially in parallel with the axial direction of the stacked coil 108. Therefore, it is possible to obtain a good molded resin (see FIG. 29A) while maintaining the state of the stacked coil 108 held by the weaving wire 116 in molding the outer surface of the wound coil 100 by molten resin in a next process for example because the molten resin applies no excessive load to the weaving wire 116 by setting directions for filling the molten resin injected from gates of a die assembly described later.

After weaving the circular arc projections 114a and 114b of the upper and lower plates 102 and 104 by the weaving wire 116 alternately along the vertical direction, drawing the weaving wire 116 along the peripheral direction of the upper and lower plates 102 and 104 and winding the weaving wire 116 once around an outer peripheral surface of another circular arc projection clockwise as indicated by arrows c18 through c20, the weaving ending portion of the weaving wire 116 is cut by the cutter means not shown. At this time, because the other circular arc projection of the lower plate 104 is provided with the notch portion 136 formed so as to secure the weaving ending portion of the weaving wire 116, the notch portion 136 smoothly secures the weaving ending portion of the weaving wire 116.

After constructing the wound coil 100 in which the weaving wire 116 is thus woven around the outer peripheral surfaces of the upper and lower plates 102 and 104, the wound coil 100 is taken out by separating the upper jig 12 from the lower jig 14 by the elevation mechanism not shown and is conveyed to the next process.

Thus, according to the present embodiment, the wound coil 100 composed of the bobbinless coil may be formed readily and efficiently by holding the upper and lower plates 102 and 104 disposed separately by the predetermined distance by the upper and lower jigs 12 and 14 and by winding the wire rod 106 around the peripheral surface of the claw section 240 provided in the lower jig 14 (see a block E in FIG. 30).

Further, according to the present embodiment, the isolation quality of the stacked coil 108 may be steadily secured by winding the winding beginning and ending portions of the stacked coil 108 exposed to the outside respectively to the first and second winding securing sections 110a and 110b separated in the left and right directions and by drawing those portions in cross by separating to the upper and lower surfaces of the plate portion 124, in addition to that the isolation quality of the stacked coil 108 arrayed between the upper and lower plates 102 and 104 is suitably maintained.

In other words, the present embodiment allows the isolation quality to be steadily maintained by drawing the winding beginning portion of the stacked coil 108 along the under surface 104b of the plate portion 124 of the lower plate 104 made of resin via the second guide groove 126, by drawing the winding ending portion of the stacked coil 108 so as to cross with the winding beginning portion along the upper surface 104a of the plate portion 124 of the lower plate 104 and by interposing the plate portion 124 made of a resin material between the winding beginning portion and the winding ending portion to keep a non-contact state.

While one embodiment of the invention has been described above, the invention is not limited to the embodiment described above and may be modified within a scope of the gist of the invention as follows for example.

Although the claw section 240 has been arranged to have the first through third split claws 241a through 241c in the embodiment described above, the number of split claws is not limited to be three and may be two or four or more. Still more, the number of the radial springs 251 and the thrust springs 265 may be adequately changed.

Although the arrangement in which the thrust spring 265 is a compression coil spring has been exemplified in the embodiment described above, it may be a rubber material formed by adequate rubber for example. The same applies also to the radial spring 251.

Although the upper jig 12 has been provided with the tapered portion 220 and the lower jig 14 has been provided with the claw section 240 in the embodiment described above, the function of the upper jig 12 may be reversed with the function of the lower jig 14. That is, the upper jig 12 may be provided with the claw section 240 and the lower jig 14 may be provided with the tapered portion 220.

Figure 23:
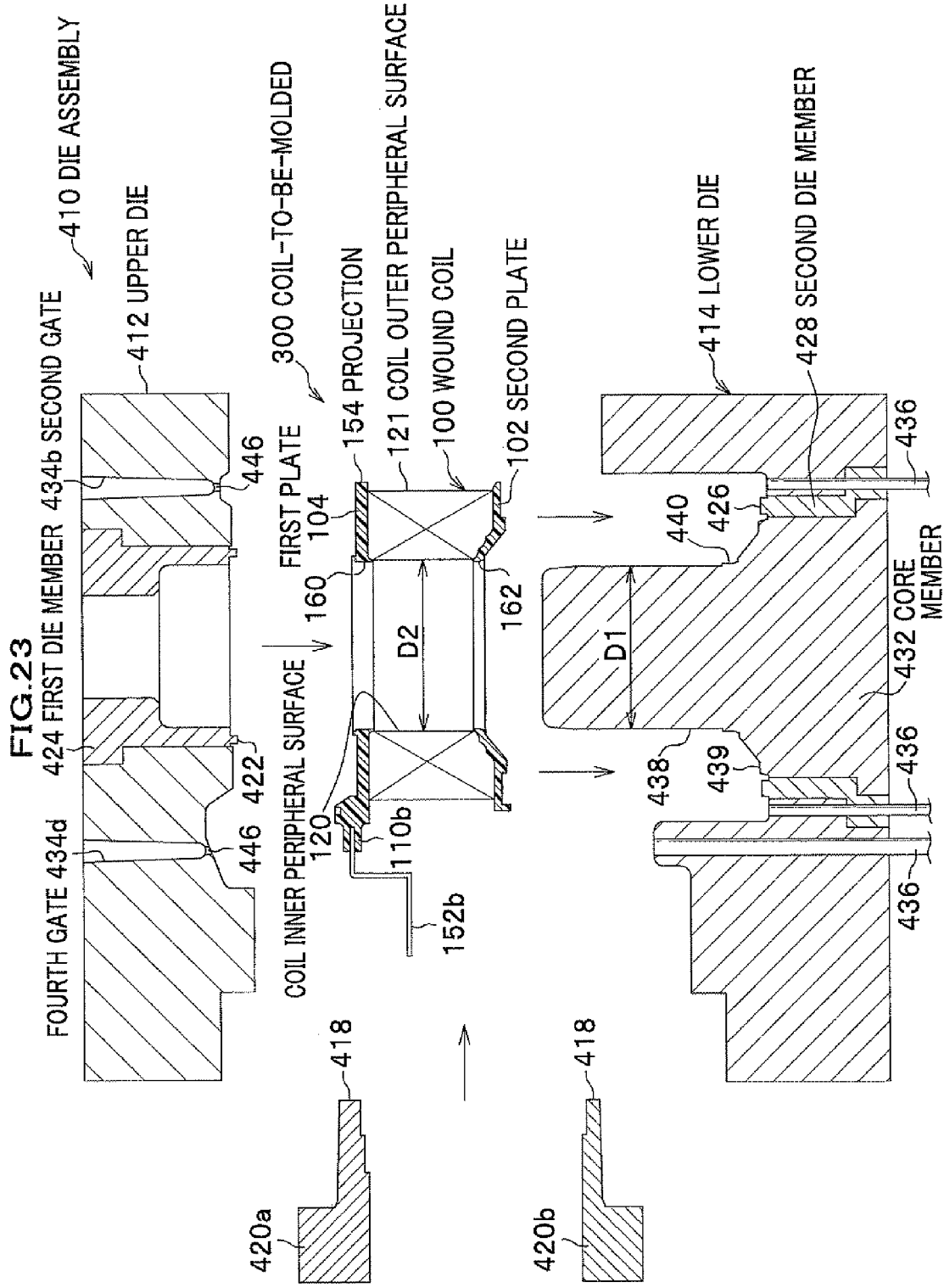
FIG. 23 is a schematic structural longitudinal section view of a die assembly for carrying out a method of molding the wound coil.
Figure 24:
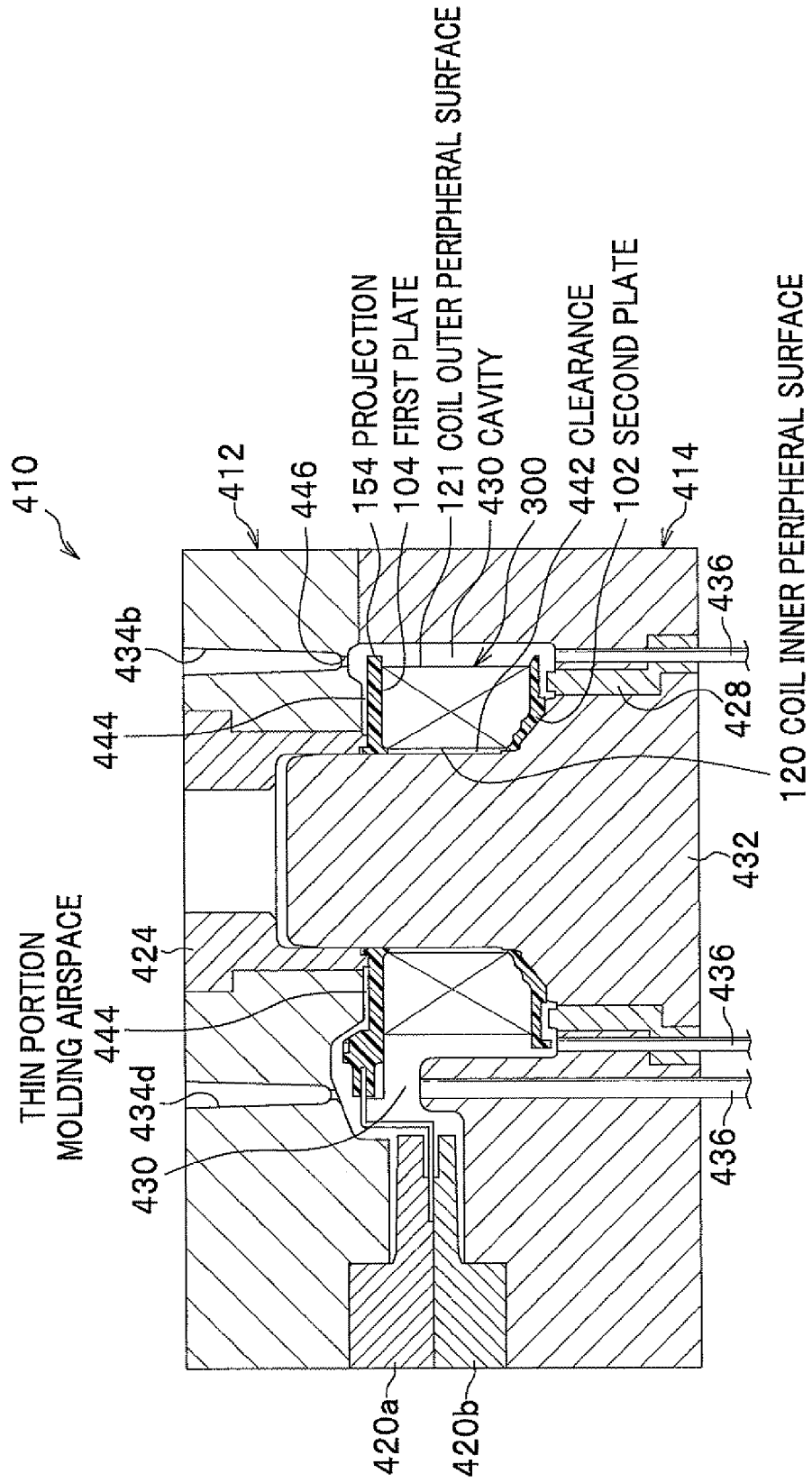
FIG. 24 is a schematic structural longitudinal section view of the die assembly shown in FIG. 23 that is clamped after loading a form-to-be-molded into a cavity of the assembly.

Next, a process of acquiring the molded coil by molding the wound coil 100 formed in the previously described process with the resin material will be explained below. FIG. 23 is a schematic structural longitudinal section view of the die assembly for molding the wound coil and FIG. 24 is a schematic structural longitudinal section view of the die assembly shown in FIG. 23 that is clamped after loading the form-to-be-molded into a cavity of the assembly.

Figure 29A:
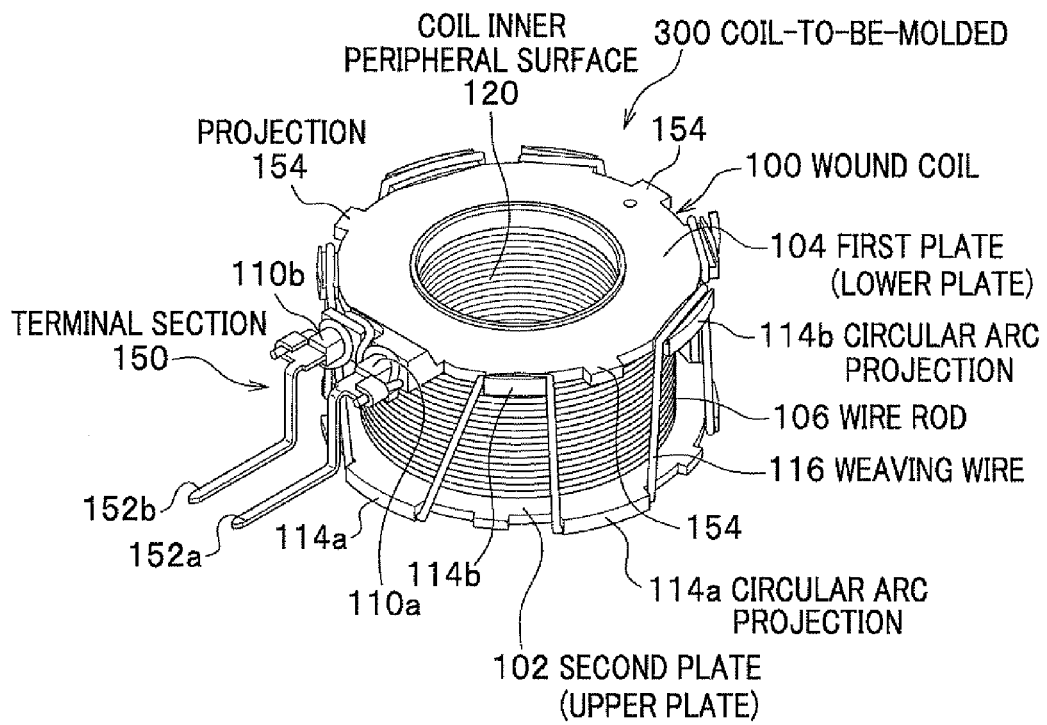
FIG. 29A is a perspective view showing the coil-to-be-molded and FIG. 29B shows a perspective view of the molded resin.

First, the coil-to-be-molded 300 whose outer surface, except of its inner surface, is to be coated (molded) by the resin material will be explained. As shown in FIG. 29A, the coil-to-be-molded 300 has the wound coil 100 sandwiched between the first plate (the lower plate) 104 on an upper side in the figure and the second plate (the upper plate) 102 on a lower side in the figure respectively made of the resin material and having the coil stacked by the wire rod 106 into the plurality of levels, a terminal section 150 connected with the pair of winding securing sections 110a and 110b protruding in the radial outward direction of the first plate 104 and is electrically connected with the coil and the weaving wire 116 for holding the first and second plates 104 and 102 by weaving the circular arc projections 114a and 114b of the first and second plates 104 and the second plate 102 disposed distant by the predetermined distance in the vertical direction.

It is noted that the coil-to-be-molded 300 is arranged such that the lower plate 104 composing the wound coil 100 shown in FIG. 1 becomes the first plate 104 on the upper side and the upper plate 102 becomes the second plate 102 on the lower side. That is, the coil-to-be-molded 300 is disposed such that the wound coil 100 is vertically turned over. Beside them, the same or corresponding structural elements will be explained below by denoting the same reference numerals.

The terminal section 150 has a terminal 152a electrically connected with the winding beginning portion of the wire rod 106 and a terminal 152b electrically connected with the winding ending portion of the wire rod 106. Still more, no core material such as a coil bobbin is provided in the coil inner peripheral surface 120 of the wound coil 100 and the coil inner peripheral surface 120 is exposed to the outside.

Figure 28:
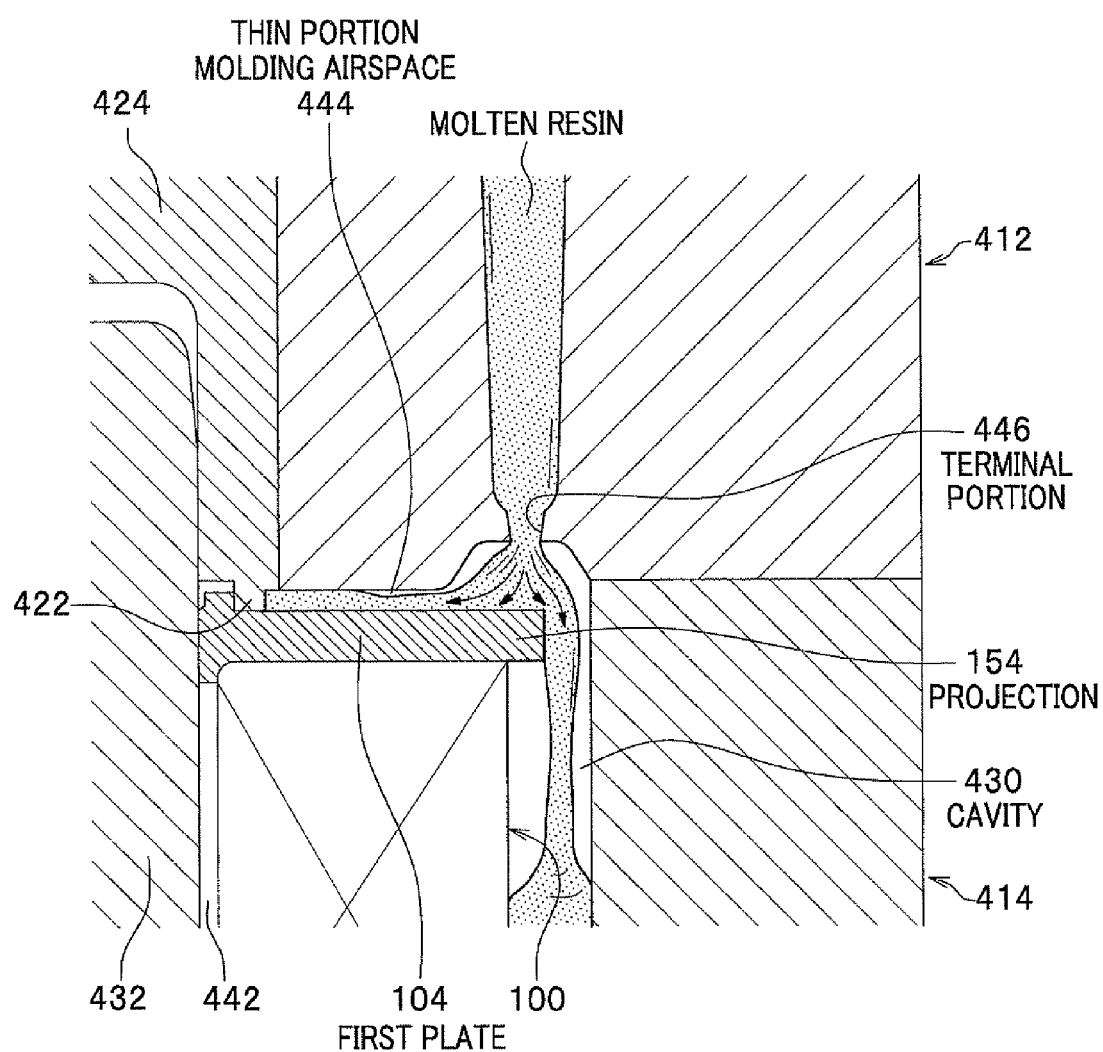
FIG. 28 is a partially enlarged longitudinal section view showing a state in which a flow of the molten resin injected from the gate to a thin molding airspace portion is urged by the projection.

The first plate 104 is provided with three projections 154 that project by a predetermined length in the radial outward direction from the coil outer peripheral surface 121 (see FIG. 23) and are distant equiangularly along the peripheral direction between the neighboring circular arc projections 114b. As shown in FIG. 28, each of these projections 154 functions as a molten resin receiving section positioned right under a terminal portion of each gate when the molten resin is injected into a cavity 430 from a plurality of gates of an upper die 412 as described below and promotes a flow of the molten resin so that the molten resin received by the projection 154 is filled into a thin portion molding airspace 444 described below.

As shown in FIG. 23, the die assembly 410 includes the upper die 412 liftably provided by a elevation mechanism not shown, a lower die 414 fixed on a base not shown and a pair of split dies 420a and 420b movably provided in the horizontal direction through a displacement mechanism not shown and provided with a projection that functions as a nesting for forming a hollow coupler section 502 described later (see FIG. 29B). It is noted that the pair of split dies 420a and 420b may be constructed in a body without splitting them.

Still more, the die assembly 410 has a first die member 424 fitted into a hole of the upper die 412 and having a ringed projection 422 bulgingly formed to butt the upper surface in a vicinity of an inner peripheral edge portion of the first plate 104 on the upper side and to press and seal the wound coil 100 downward, a second die member 428 fitted into a hole of the lower die 414 and having a ringed projection 426 bulgingly formed so as to face the under surface of the second plate 102 on the lower side to form a ringed groove (not shown) for seal-fitting to a bottom surface of the molded resin 500 (see FIG. 29B) and a core member 432 fitted into the second die member 428 for forming a cavity 430 between wall surfaces of the upper and lower dies 412 and 414 (see FIG. 24). It is noted that the die assembly 410 is provided with a degassing passage not shown communicating with the cavity 430.

Figure 27:
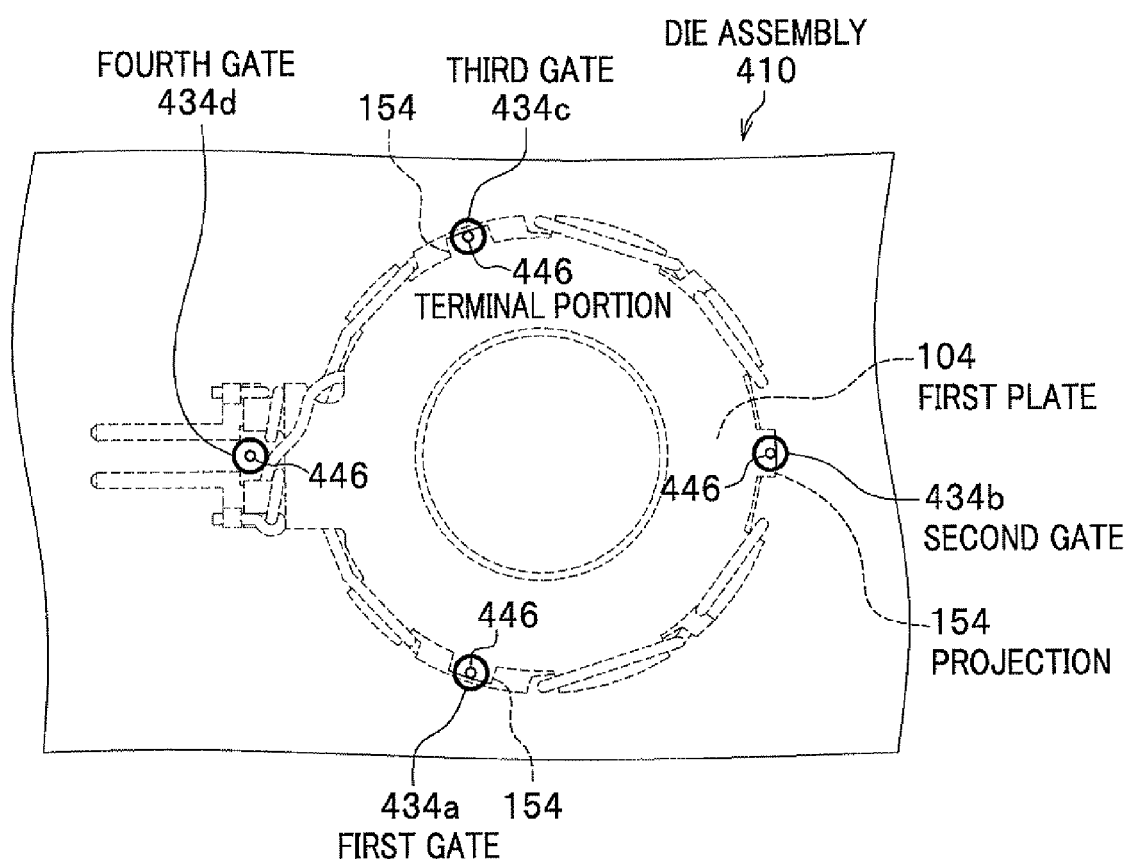
FIG. 27 is a plan view of the die assembly showing positional relationship among the projections and the gates of a first plate.

The upper die 412 is provided with a plurality of gates connected to a molten resin supplier not shown including a plastic injection molding machine for example to discharge (inject) the molten resin to the cavity 430. As shown in FIG. 27, the plurality of gates is disposed by being separated equiangularly in the peripheral direction of the wound coil 100 and includes first through third gates 434a through 434c that form a sealing resin 504 (see FIG. 29B) that coats the outer peripheral surface and the both end surfaces in the axial direction of the wound coil 100 and a fourth gate 434d that forms the coupler section 502 formed of a housing storing the first and second terminals 152a and 152b.

Here, the first through third gates 434a through 434c are disposed at positions corresponding to the projections 154 of the upper die 412 i.e., right above or substantially right above the projections 154, when the dies are clamped as shown in FIGS. 24 and 27. It is noted that FIG. 27 is a plan view of the clamped die assembly 410 when seen from above and shows the projections 154 of the first plate 104 disposed within the cavity 430 by solid lines for convenience to clarify the positional relationship in the vertical direction between the first through third gates 434a through 434c and the projections 154 of the first plate 104.

Figure 26:
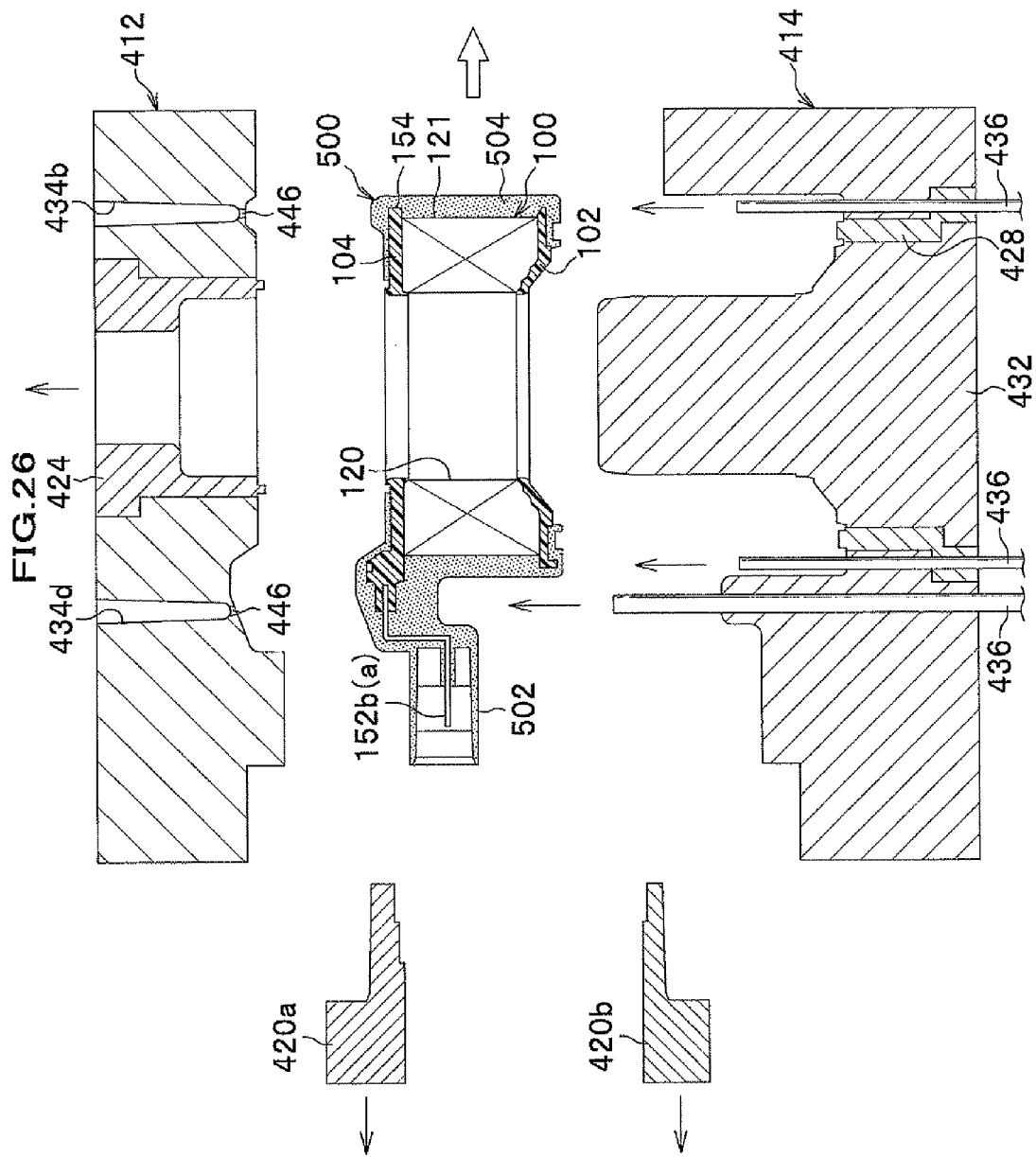
FIG. 26 is a schematic structural longitudinal section view of the die assembly opened to take out the molded resin.

The lower die 414 is provided with a plurality of ejector pins 436 (see FIG. 26) for taking out the molded resin 500 out of the cavity 430 by pressing the molded resin 500 whose molten resin is solidified upward. The ejector pins 436 are provided so as to be displaceable in the vertical direction by a driving action of an actuator not shown.

As shown in FIG. 23, the core member 432 is provided with a columnar section 438 that contacts the inner peripheral surface 160 of the first plate 104 and performs positioning and sealing functions with the inner peripheral surface 160 of the first plate 104, a broad base portion 440 composed of a ringed enlarged portion that contacts the inner peripheral surface 162 of the second plate 102 and performs positioning and sealing functions with the inner peripheral surface 162 of the second plate 102 and a ringed stepped portion 439 formed closely to the second die member 428 under the broad base portion 440 to press the under surface in the vicinity of the curved portion of the second plate 102 upward.

A diameter (outer diameter) D1 of the columnar section 438 of the core member 432 that faces to the coil inner peripheral surface 120 between the first plate 104 and the second plate 102 in the vertical direction is set to be smaller than an inner diameter D2 of the coil inner peripheral surface 120 (D1<D2). Accordingly, when the coil-to-be-molded 300 is loaded into the cavity 430 and the die assembly is clamed, the core member 432 is kept in a non-contact state with the coil and a clearance 442 is created between the outer peripheral surface of the columnar section 438 of the core member 432 and the coil inner peripheral surface 120 as shown in FIG. 24.

It is noted that although the upper die 412 is provided liftably with respect to the lower die 414 in the present embodiment, the invention is not limited to that and it will do if the upper die 412 and the lower die 414 are provided relatively separably.

The die assembly 410 for carrying out the molding is constructed basically as described above. Next, its actions and effects will be explained.

At first, after loading the coil-to-be-molded 300 (see FIG. 29A) into the cavity 430 of the die assembly 410, the upper die 412 and the first die member 424 are lowered in a body by means of the elevation mechanism not shown and the pair of split dies 420a and 420b are displaced by the displacement mechanism not shown to clamp the die assembly as shown in FIG. 23.

In the clamped state, the terminal portions 446 of the first through third gates 434a through 434c are positioned so as to correspond to the projections 154 of the first plate 104 in the vertical direction. That is, the terminal portions 446 of the first through third gates 434a through 434c come at the positions right above or substantially right above the projections 154. Still more, in the clamped state described above, the ringed airspace for molding thin portion 444 whose vertical size is small and radial size is narrow is formed between a bottom wall of the upper die 412 and the upper surface of the first plate 104. It is noted that the thin portion molding airspace 444 composes a part of the cavity 430 and forms a thin portion 512 that composes a bottom surface of a ringed concave portion 506 formed on an outer end surface (upper surface) of the molded resin 500 described later.

Figure 25:
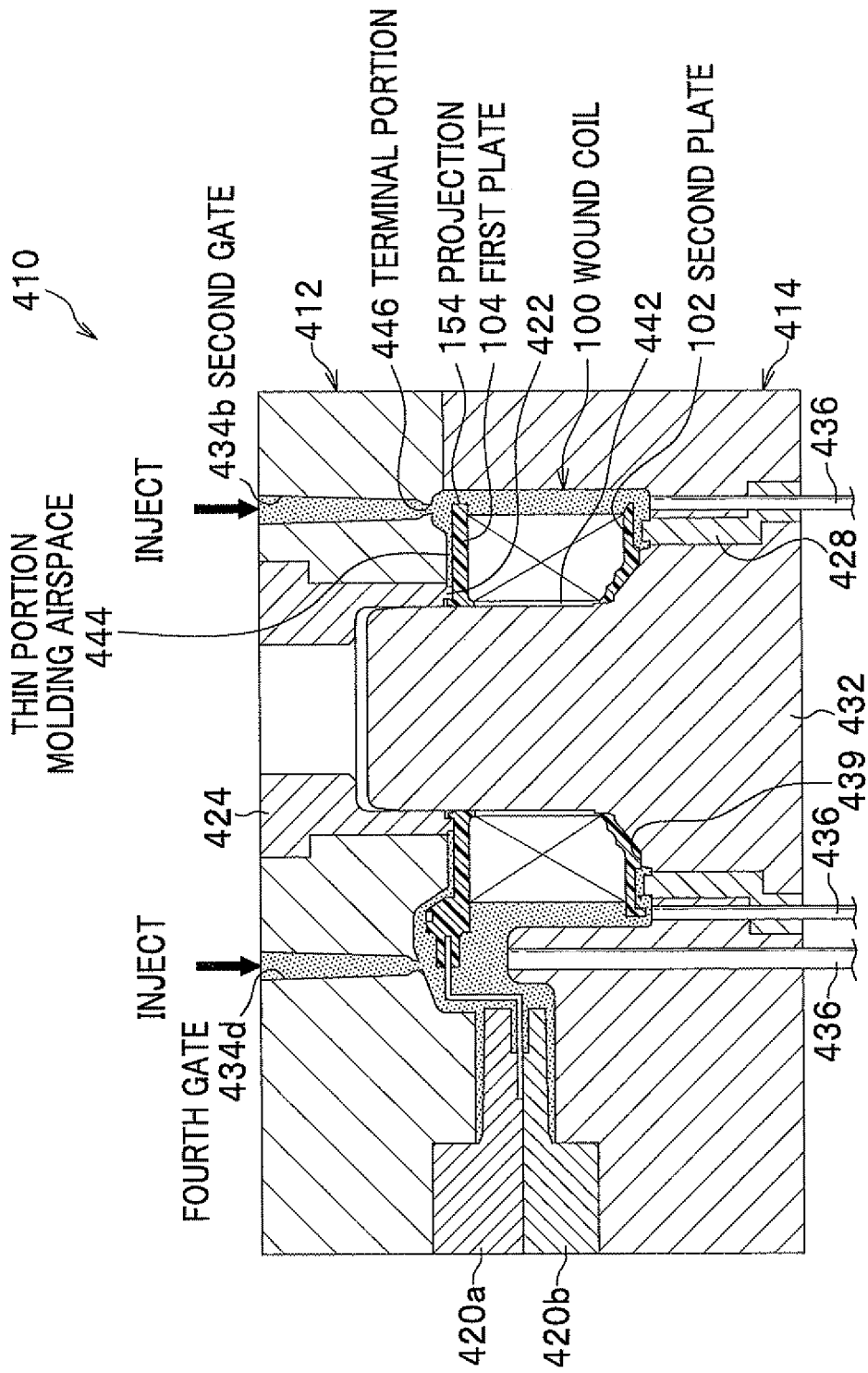
FIG. 25 is a schematic structural longitudinal section view of the die assembly in a state of injecting molten resin from gates in the clamped state.

After claming the dies, the molten resin supplying source not shown is urged to inject the molten resin from the first through fourth gates 434a through 434d (see FIG. 25). The molten resin discharged out of the terminal portions 446 of the first through third gates 434a through 434c is received by the projections 154 of the first plate 104 that function as the molten resin receiving sections, is promoted to flow into and to smoothly fill the thin portion molding airspace 444 formed between the bottom wall of the upper die 412 and the upper surface of the first plate 104 and is also flown downward along the cavity 430 formed between the outer peripheral surface of the coil-to-be-molded 300 and the side wall of the lower die 414 (see FIG. 28). It is noted that a direction in which the molten resin is filled is supposed to be parallel with the axial direction of the wound coil 100 and to be gradually filled from the lower part to the upper part of the cavity 430.

In other words, if no projection 154 is provided right under the terminal portions 446 of the first through third gates 434a through 434c, there is nothing that receives the molten resin discharged out of the terminal portions 446 of the first through third gates 434a through 434c, so that the molten resin flows only downward along the cavity 430. Accordingly, the molten resin hardly flows into the thin portion molding airspace 444 that extends in the horizontal direction (the direction orthogonal to the discharge direction of the molten resin) from the terminal portions 446 of the first through third gates 434a through 434c and there is a possibility of causing short molding due to an insufficient amount of the molten resin to be filled into the thin portion molding airspace 444.

However, because the projection 154 that functions as the molten resin receiving section is provided so as to project by the predetermined length in the radial outward direction at the outer periphery of the first plate 104 so that it is positioned right under each of the first through third gates 434a through 434c and the projection 154 changes the flow direction of the molten resin such that the molten resin can flow in the horizontal direction from the terminal portion 446 of each gate, the present embodiment can suitably prevent the short molding described above from occurring by smoothly filling the molten resin into the thin portion molding airspace 444.

At this time, the ringed projection 422 of the first die member 424 butts the upper surface near the inner peripheral portion of the first plate 104 and presses down the coil-to-be-molded 300, so that it may suitably prevents such a phenomena that the first and second plates 104 and 102 are lifted up from otherwise occurring when the molten resin is filled along the cavity 430.

Further, the inner peripheral surface 160 of the first plate 104 contacts the outer peripheral surface of the columnar section 438 of the core member 432, thus forming a first sealing section, and the inner peripheral surface 162 of the second plate 102 contacts the broad base portion 440 of the core member 432, thus forming a second sealing section. Still more, because the first plate 104 on the upper side and the second plate 102 on the lower side are positioned respectively at predetermined positions by the columnar section 438 and the broad base portion 440 of the core member 432, coaxiality (coaxial precision) of the coil-to-be-molded 300 is improved. Accordingly, when the molten resin is filled along the cavity 430, the first and second sealing sections formed by the inner peripheral surfaces 160 and 162 of the first and second plates 104 and 102 suitably prevent the molten resin from entering the coil inner peripheral surface 120 and allow the molten resin to be filled favorably into the coil-to-be-molded 300 while assuring the coaxiality.

Still more, the clearance 442 is formed between the outer peripheral surface of the columnar section 438 of the core member 432 and the coil inner peripheral surface 120 as described above. As a result, the wire rod 106 stacked on the coil inner peripheral surface 120 is suitably protected without being damaged in loading into the cavity 430 or by the flow of the molten resin.

The sealing function may be improved further in the present embodiment in cooperation with the sealing action of the first sealing section by providing the first die member 424 having the ringed projection 422 that presses down the vicinity of the inner peripheral surface of the first plate 104. The sealing function may be also improved further in the present embodiment in cooperation with the sealing action of the second sealing section by providing the ringed stepped portion 439 that presses up the under surface in the vicinity of the bend portion of the second plate 102 in the core member 432.

When the molten resin is solidified after competing the injection of the molten resin into the cavity 430 from the first through fourth gates 434a through 434d, the molded resin (molded coil) 500 in which the both end surfaces in the axial direction and the outer peripheral surface of the wound coil 100, except of the coil inner peripheral surface 120, are molded by the resin material is formed (see a block E3 in FIG. 30). Then, the molded resin 500 may be readily taken out of the cavity 430 of the die assembly 410 and may be transferred to a next step by raising the plurality of ejector pins 436 under the driving action of the actuator not shown and by pressing the molded resin 500 upward.

Figure 29B:
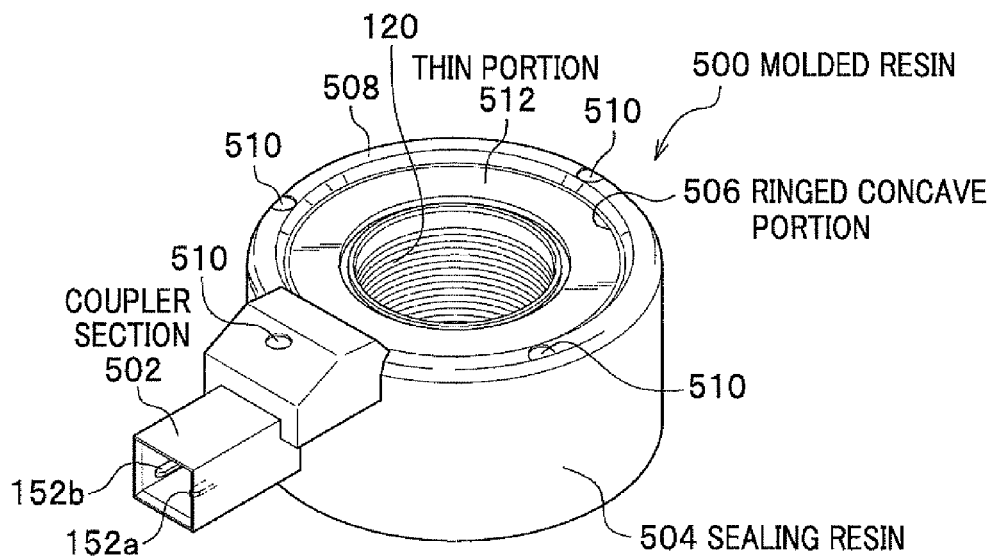

As shown in FIG. 29B, the molded resin 500 is provided, at the upper surface thereof (the outer end surface along the axial direction), with a ringed concave portion 506 formed so as to attach a sealing member not shown and a plurality of traces of gates 510 having substantially a shape of a small circle are formed on a ringed convex edge portion 508 located in the radial outward direction from the ringed concave portion 506. Accordingly, no gate trace is formed within the ringed concave portion 506 that becomes the sealing surface, so that the sealing surface composed of a flat surface having no irregularity exhibits the sealing function suitably.

In other words, the traces of gates 510 are formed on the outer peripheral side of the thin portion 512 of the molded resin 500 formed by the thin portion molding airspace 444 by disposing The first through third gates 434a through 4343 in the radial outward direction more than the thin portion molding airspace 444. Accordingly, because no traces 510 are formed on the thin portion 512 that becomes the sealing surface, the sealing surface composed of the flat surface having no irregularity exhibits the sealing function suitably.

Still more, the thin portion 512 composing the bottom surface of the ringed concave portion 506 is formed on the outer side surface along the axial direction of the molded resin 500. The thin portion 512 is formed by the molten resin filled into the thin portion molding airspace 444 that is a part of the cavity 430 is solidified, so that a good molded surface may be formed from which any short molding and sink are suitably prevented as described above.

It is noted that although the mode described above is the best mode for carrying out the invention, it is not intended to limit the invention to such mode. Accordingly, the mode for carrying out the invention may be variously modified within a scope in which the subject matter of the invention is not changed.

What is claimed is:

1. A coil winding device for fabricating a wound coil having a coil formed by winding a wire rod and upper and lower plates for sandwiching the coil and having no coil bobbin, comprising:
    an upper jig for attaching the upper plate;
    a lower jig for attaching the lower plate;
    the upper and lower jigs being provided so as to be relatively displaceable;
    the lower jig including:
    a cylindrical claw section having a peripheral surface around which the wire rod is wound and composed of a plurality of claws that slide in a radial direction;
    a first spring member for urging each claw in a radial inner direction; and
    a second spring member for urging the claw section upward.

2. The coil winding device as set forth in claim 1, further comprising a ringed plate between the claw section and the second spring member.

3. The coil winding device as set forth in claim 1, wherein a guide groove for guiding the wire rod is formed on a peripheral surface of at least one claw among the plurality of claws.

4. The coil winding device as set forth in claim 3, wherein the peripheral surface of at least one claw among the plurality of claws is a smooth curved surface.

5. A coil winding device for fabricating a wound coil having a coil formed by winding a wire rod and upper and lower plates for sandwiching the coil, comprising:
    an upper jig for attaching the upper plate; and
    a lower jig for attaching the lower plate;
    the upper and lower jigs being provided so as to be relatively displaceable;
    the lower jig including:
    a cylindrical claw section having a peripheral surface around which the wire rod is wound and composed of a plurality of claws that slide in a radial direction;
    wherein the claw section opens when the upper jig is inserted into the claw section of the lower jig and the upper jig is assembled with the lower jig;
    each claw presses an inner peripheral lower end surface of the upper plate axially upward and an inner peripheral upper end surface of the lower plate axially downward, respectively;
    the upper jig applying pressure for pressing the upper plate vertically downward and the lower jig applying pressure for pressing the lower plate vertically upward.

6. A coil winding system for winding a coil as a wound coil, comprising:
    a coil winding device provided with an upper jig to which an upper plate is attached and a lower jig to which a lower plate is attached in such a manner that the upper and lower jigs are relatively displaceable;
    a wire rod supplying means for supplying a wire rod to be wound around the coil winding device as a coil; and
    a tension device for applying predetermined tension to the wire rod supplied to the coil winding device;
    wherein the coil winding device has a claw section as a wire winding section around which the wire rod is wound between the upper and lower plates and the claw section contains a plurality of split claws that slide in a radial direction when the upper jig is assembled coaxially with the lower jig.

7. The coil winding system according to claim 6, wherein the wound coil has a stacked coil having the coil stacked into a plurality of levels by winding the wire rod between the upper and lower plates and a weaving wire for holding the upper and lower plates by alternately weaving projections formed around an outer periphery of the upper and lower plates.

* * * * *